US012637576B2

(12) United States Patent
Kuriyama et al.

(10) Patent No.: US 12,637,576 B2
(45) Date of Patent: May 26, 2026

(54) AQUEOUS INK, INK SET, INK JET RECORDING METHOD AND INK JET RECORDING APPARATUS

(71) Applicant: CANON KABUSHIKI KAISHA, Tokyo (JP)

(72) Inventors: Akira Kuriyama, Kanagawa (JP); Yoshihide Aikawa, Kanagawa (JP); Masanori Yoshida, Chiba (JP); Kazuya Nushiro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 18/377,337

(22) Filed: Oct. 6, 2023

(65) Prior Publication Data

US 2024/0150597 A1 May 9, 2024

(30) Foreign Application Priority Data

Oct. 18, 2022 (JP) ................................ 2022-167229
Oct. 18, 2022 (JP) ................................ 2022-167230
(Continued)

(51) Int. Cl.
*C09D 11/107* (2014.01)
*B41J 2/01* (2006.01)
(Continued)

(52) U.S. Cl.
CPC ............... *C09D 11/107* (2013.01); *B41J 2/01* (2013.01); *B41J 2/2107* (2013.01);
(Continued)

(58) Field of Classification Search
CPC ......... C09D 11/36; C09D 11/40; C09D 11/30; C09D 11/38; C09D 11/32; C09D 11/322;
(Continued)

(56) References Cited

U.S. PATENT DOCUMENTS 7,285,159 B2 10/2007 Aikawa et al.
7,288,143 B2 10/2007 Aikawa et al.
(Continued)

FOREIGN PATENT DOCUMENTS

CN 113136014 A 7/2021
EP 2371574 A1 10/2011
(Continued)

OTHER PUBLICATIONS

European Search Report issued in corresponding European Application No. 23203141.9 dated Mar. 4, 2024.

*Primary Examiner* — Manish S Shah
(74) *Attorney, Agent, or Firm* — Venable LLP

(57) ABSTRACT

Provided is an aqueous ink that can record an image achieving both of high abrasion resistance and high color developability. The aqueous ink is an aqueous ink for ink jet including: a coloring material; and a resin particle. A resin for forming the resin particle includes a unit having an aromatic group, a unit having a cyano group, a unit derived from a (meth)acrylic acid ester having a branched alkyl group and a unit represented by the following general formula (1). In the following general formula (1), "n" represents the number of a repeating unit, $R_1$ represents an alkyl group and E represents the number of repeating units of an ethylene oxide group and satisfies E≥1.

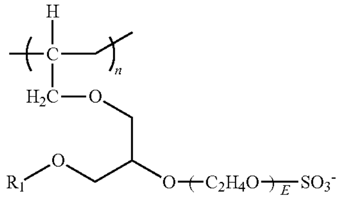

(1)

23 Claims, 1 Drawing Sheet

(30) Foreign Application Priority Data

Nov. 25, 2022 (JP) ................................ 2022-188254
Sep. 14, 2023 (JP) ................................ 2023-148885

(51) Int. Cl.

| | |
|---|---|
| ***B41J 2/21*** | (2006.01) |
| ***C09D 11/106*** | (2014.01) |
| ***C09D 11/322*** | (2014.01) |
| ***C09D 11/326*** | (2014.01) |
| ***C09D 11/36*** | (2014.01) |
| ***C09D 11/38*** | (2014.01) |
| ***C09D 11/40*** | (2014.01) |
| ***C09D 11/54*** | (2014.01) |

(52) U.S. Cl.
CPC .......... *C09D 11/106* (2013.01); *C09D 11/322* (2013.01); *C09D 11/326* (2013.01); *C09D 11/36* (2013.01); *C09D 11/38* (2013.01); *C09D 11/40* (2013.01); *C09D 11/54* (2013.01)

(58) Field of Classification Search
CPC ... C09D 11/324; C09D 11/328; C09D 11/101; C09D 11/102; C09D 11/005; C09D 11/54; C09D 11/52; C09D 11/106; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 7,294,184 | B2 | 11/2007 | Fujimoto et al. | |
| 7,374,606 | B2 | 5/2008 | Sato et al. | |
| 7,445,325 | B2 | 11/2008 | Aikawa et al. | |
| 7,557,150 | B2 | 7/2009 | Teshima et al. | |
| 7,615,113 | B2 | 11/2009 | Aikawa et al. | |
| 7,927,412 | B2 | 4/2011 | Kuriyama et al. | |
| 8,408,691 | B2 | 4/2013 | Koike et al. | |
| 8,746,865 | B2 | 6/2014 | Tojo et al. | |
| 9,738,102 | B2 | 8/2017 | Ganapathiappan et al. | |
| 9,738,803 | B2 | 8/2017 | Horiuchi et al. | |
| 10,240,053 | B2 | 3/2019 | Nushiro et al. | |
| 10,280,326 | B2 | 5/2019 | Saito et al. | |
| 10,494,762 | B2 | 12/2019 | Amin et al. | |
| 10,723,135 | B2 | 7/2020 | Kawabe et al. | |
| 10,843,482 | B2 | 11/2020 | Aikawa et al. | |
| 10,843,483 | B2 | 11/2020 | Saito et al. | |
| 10,864,747 | B2 | 12/2020 | Nakagawa et al. | |
| 11,104,820 | B2 | 8/2021 | Abe et al. | |
| 11,827,034 | B2 | 11/2023 | Kusada et al. | |
| 2008/0249217 | A1* | 10/2008 | Lee | C09D 11/40 524/556 |
| 2009/0234058 | A1* | 9/2009 | Sasada | C09D 11/324 524/495 |
| 2011/0057987 | A1* | 3/2011 | Inushima | C09D 11/326 347/21 |
| 2014/0098164 | A1 | 4/2014 | Ng et al. | |
| 2017/0306156 | A1* | 10/2017 | Burns | C09D 11/324 |
| 2018/0030292 | A1* | 2/2018 | Gotou | C09D 11/033 |
| 2021/0002470 | A1* | 1/2021 | Kishi | C08F 257/02 |
| 2021/0253884 | A1* | 8/2021 | Nagao | B41M 5/0023 |
| 2023/0077739 | A1 | 3/2023 | Nakata et al. | |
| 2023/0158809 | A1 | 5/2023 | Yoshida et al. | |

FOREIGN PATENT DOCUMENTS

| | | | |
|---|---|---|---|
| EP | 3124553 | A1 | 2/2017 |
| JP | 2001-138629 | A | 5/2001 |
| JP | 2021-008604 | A | 1/2021 |
| WO | 2011028201 | A1 | 3/2011 |

* cited by examiner

AQUEOUS INK, INK SET, INK JET RECORDING METHOD AND INK JET RECORDING APPARATUS

BACKGROUND OF THE INVENTION

Field of the Invention

The present invention relates to an aqueous ink, an ink set, an ink jet recording method and an ink jet recording apparatus.

Description of the Related Art

In recent years, the frequency at which an ink jet recording apparatus is utilized in a commercial printing field or an industrial printing field has started to increase. In those printing fields, as compared to a so-called household printing field, a recorded product is required to have, as its performance, high color developability while achieving high abrasion resistance.

A method using an ink including a resin particle is available for achieving abrasion resistance. In, for example, Japanese Patent Application Laid-Open No. 2021-008604, for the purpose of achieving both of the abrasion resistance and image clarity of an image, there is a proposal of an aqueous ink including a predetermined resin particle and a cyclic amide serving as a water-soluble organic solvent. There is a proposal of the use of a resin particle including the following portions as the above-mentioned resin particle: a core portion including a cyano group-containing unit; and a shell portion, which includes an aromatic group-containing unit, an anionic group-containing unit and a unit derived from a cross-linking agent and which is free of any cyano group-containing unit.

SUMMARY OF THE INVENTION

The inventors of the present invention have investigated abrasion resistance through use of information disclosed in Japanese Patent Application Laid-Open No. 2021-008604. However, the inventors have found that the ink disclosed in the literature is susceptible to improvement for obtaining an image satisfying higher levels of abrasion resistance and color developability that have been recently required.

Accordingly, an object of the present invention is to provide an aqueous ink that can record an image achieving both of high abrasion resistance and high color developability. In addition, another object of the present invention is to provide an ink set, an ink jet recording method and an ink jet recording apparatus each using the aqueous ink.

That is, according to the present invention, there is provided an aqueous ink for ink jet including: a coloring material; and a resin particle, wherein a resin for forming the resin particle includes a unit having an aromatic group, a unit having a cyano group, a unit derived from a (meth) acrylic acid ester having a branched alkyl group and a unit represented by the following general formula (1):

(1)

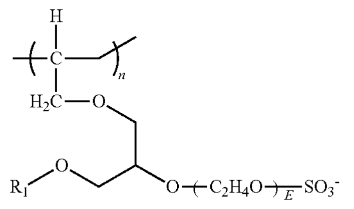

in the general formula (1), "n" represents the number of a repeating unit, $R_1$ represents an alkyl group and E represents the number of repeating units of an ethylene oxide group and satisfies $E \geq 1$.

Further features of the present invention will become apparent from the following description of exemplary embodiments with reference to the attached drawings.

DESCRIPTION OF THE EMBODIMENTS

Figure 1:
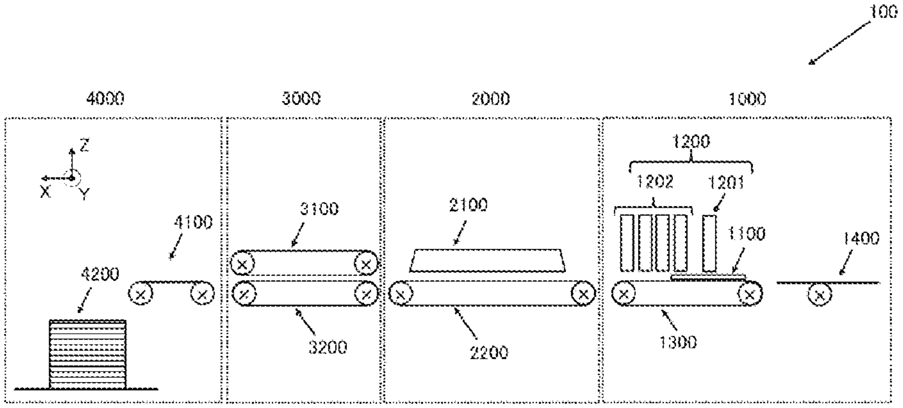
FIG. 1 is a schematic view for illustrating an ink jet recording apparatus according to one embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink and reaction liquid for ink jet are sometimes referred to as simply as "ink" and "reaction liquid". Physical property values are values at normal temperature (25° C.), unless otherwise stated. The descriptions "(meth)acrylic acid" and "(meth)acrylate" refer to "acrylic acid or methacrylic acid" and "acrylate or methacrylate", respectively. In the present invention, "unit" constituting a resin refers to a repeating unit derived front one monomer.

The inventors of the present invention have investigated a resin particle for forming an aqueous ink that can record an image achieving both of high abrasion resistance and high color developability required in a commercial printing field and an industrial printing field. As a result, the inventors have revealed the following.

The inventors of the present invention have revealed that the achievement of high abrasion resistance requires the following configurations a) and (b): (a) a resin for forming a resin particle to be incorporated into the ink includes a unit having an aromatic group; and (b) the resin for forming the resin particle described above includes a unit derived from a (meth)acrylic acid ester having a brandied alkyl group.

The inventors of the present invention have assumed the mechanism via which the above-mentioned configurations (a) and (b) express high abrasion resistance to be as described below. A coloring material typically has an aromatic ring or an alicyclic hydrocarbon moiety. First, the unit having an aromatic group in the resin for forming the resin particle is a rigid structure and the aromatic ring or alicyclic hydrocarbon moiety of the coloring material and the unit having an aromatic group in the resin for forming the resin particle interact with each other. The resin particle and the coloring material are caused to be present close to each other by the interaction. Probably as a result of the foregoing, the hardness of an ink layer formed by the resin particle and the coloring material on an image becomes higher to improve the abrasion resistance of the image. The abrasion resistance-improving effect obviously differed from that in the case where the unit having an aromatic group was not used in the resin for forming the resin particle and the unit having an aromatic group was substituted with a linear unit.

Next, the inventors of the present invention have revealed that the use of a resin particle formed from a resin including the unit derived from a (meth)acrylic acid ester having a branched alkyl group provides abrasion resistance higher than that in the case where a resin particle in which the branched alkyl group is changed to a linear alkyl group is used. This is probably because while the unit derived from a (meth)acrylic acid ester having a branched alkyl group is bound to a recording medium at a plurality of sites by an effect of its branched alkyl group, a unit having a linear alkyl group is bound to the recording medium at a smaller number of sites.

In addition, the inventors of the present invention have revealed that the achievement of high color developability requires the following configurations (c) and (d): (c) the resin for forming the resin particle described above includes a unit having a cyano group; and (d) the resin for forming the resin particle described above includes a unit represented by the general formula (1).

The inventors of the present invention have assumed the mechanism via which the above-mentioned configurations (c) and (d) express high color developability to be as described below. A coloring material typically has a polar moiety in a chromophore or the like. The inventors of the present invention have revealed that when the polar moiety of the coloring material and the unit having a cyano group serving as the polar moiety of the resin particle interact with each other, a state in which the coloring material is present is moderately dispersed to suppress the localization of the coloring material on an image, to thereby improve the efficiency with which the coloring material develops a color. Further, the inventors have revealed that when the resin fix forming the resin particle has a sulfonic acid group in the unit represented by the general formula (1), the aggregation of the resin particles in the ink and immediately after the application of the ink to a recording medium is alleviated and hence a reduction in color developability along with the aggregation is suppressed.

As described above, the use of the resin particle satisfying the above-mentioned configurations (a) to (d) can provide an aqueous ink that can record an image achieving both of high abrasion resistance and high color developability.

(Ink)

An ink of the present invention is an aqueous ink for ink jet including a resin particle. In addition, the ink is characterized in that a resin for forming the above-mentioned resin particle includes a unit having an aromatic group, a unit having a cyano group, a unit derived from a (meth)acrylic acid ester having a branched alkyl group and a unit represented by the general formula (1). Respective components to be used in the ink and the like are described in detail below

[Coloring Material]

The ink includes a coloring material. A pigment or a dye may be used as the coloring material to be incorporated into the ink and for example, a colored particle obtained by including such material in a resin particle may also be used. One or two or more kinds of coloring materials may be incorporated into the ink. The coloring material may be dissolved or dispersed in the aqueous ink or may be included in a resin particle or the like. Of such coloring materials, a coloring material dispersed by the action of a carboxylic acid group is preferred. The content (% by mass) of the coloring material in the ink is preferably 0.5% by mass or more to 15.0% by mass or less, more preferably 1.0% by mass or more to 10.0% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. In the present invention, not a resin-bonded pigment or a microcapsule pigment but a resin-dispersed pigment having resin as dispersant to physically adsorb to its particle surface of pigment or a self-dispersible pigment having a hydrophilic group bonded to its particle surface is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. Furthermore, a pigment that is dispersed by the action of water-soluble resin having carboxylic acid group is preferred. The mass ratio of the content (% by mass) of the pigment in the ink to the content (% by mass) of the resin dispersant is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. Among them, those in which the carboxylic acid group is bonded directly or via other atomic group (—R—) to the surface of the pigment particle are preferred. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted. When a self-dispersion pigment is used as the coloring material, a pigment having an anionic group (suitably a carboxylic acid group) bonded to its particle surface through any other atomic group is preferably used. Of such pigments, a self-dispersion pigment having $—C_6H_3—(COOM)_2$ (phthalic acid structure) bonded to its particle surface is particularly preferred.

A dye having an anionic group is preferably used as the dye. Specific examples of the dye may include dyes, such as azo, triphenylmethane, (aza)phthalocyanine, xanthene and anthrapyridone dyes. The dyes may be used alone or in combination thereof. The coloring material is preferably a pigment, more preferably a resin-dispersed pigment or a self-dispersible pigment.

[Resin Particle]

The ink includes the resin particle. The term "resin particle" as used herein means a resin, which is dispersed in an aqueous medium and can be present in the aqueous medium under the state of having a particle diameter. Accordingly, the resin particle is present under the state of being dispersed in the ink, that is, a resin emulsion state. In addition, the resin particle may include a coloring material (e.g., a dye, a pigment or an invisible coloring material that develops a color through fluorescence or the like) or may not include any coloring material. The resin particle may be a single-layer particle or may be formed from a plurality of layers. The resin particle is preferably a single-layer particle, that is, a particle free of any core-shell structure out of such particles.

Whether or not a resin is the "resin particle" may be determined in accordance with a method to be described below. First, a liquid (resin solid content: 10% by mass) containing a resin neutralized with an alkali (e.g., sodium hydroxide or potassium hydroxide) corresponding to its acid value is prepared. Next, the prepared liquid is diluted 10-fold (based on a volume) with pure water to prepare a sample solution. Then, when a particle having a particle diameter is measured at the time of the measurement of the particle diameter of the resin in the sample solution by a dynamic light scattering method, the resin can be determined to be the "resin particle". A particle size analyzer (e.g., a product available under the product name "UPA-EX 150" from Nikkiso Co., Ltd.) or the like may be used as a particle size distribution-measuring device using the dynamic light scattering method. Measurement conditions in this case may be set, for example, as follows: SetZero: 30 seconds; number of times of measurement: 3 times; measurement time: 180 seconds; shape: perfect spherical shape; and refractive index: 1.59. Needless to say, the particle size distribution-measuring device, the measurement conditions, and the like to be used are not limited to the foregoing. The purpose of measuring the particle diameter through use of the neutralized resin is to recognize that a particle is formed even when the resin is sufficiently neutralized to make it more difficult to form a particle. The resin having a particle shape even under such conditions is present under the state of a particle even in an aqueous ink.

The resin for forming the resin particle includes the unit having an aromatic group, the unit having a cyano group, the unit derived from a (meth)acrylic acid ester having a branched alkyl group and the unit represented by the general formula (1). The ratio by mass) of the resin including the above-mentioned 4 kinds of units to the resin for forming the resin particle is preferably 50.00% by mass or more, more preferably 100.00% by mass with respect to the total mass of the resin. That is, it is preferred that the resin particle be formed substantially only from the resin including the above-mentioned 4 kinds of units.

The resin for forming the resin particle includes the unit having an aromatic group. A monomer that is turned into the unit having an aromatic group by polymerization is preferably a monomer, which has an aromatic group and has one polymerizable functional group such as an ethylenically unsaturated bond in a molecule thereof, more preferably an ethylenically unsaturated monomer having an aromatic group. Accordingly, the unit having an aromatic group is more preferably a unit derived from an ethylenically unsaturated monomer having an aromatic group.

Examples of the aromatic group may include a phenyl group, a biphenyl group, a naphthyl group, an anthryl group, a carbazole group, a triazinyl group and a pyrenyl group, each of which may have a substituent. Examples of the substituent may include an alkyl group and a halogen atom. Of those substituents, an unsubstituted phenyl group or a phenyl group substituted with at least one kind of substituent selected from the group consisting of: an alkyl group, and a halogen atom is preferred.

Examples of the monomer for forming the unit having an aromatic group may include styrene, 4-methylstyrene, p-fluorostyrene, p-chlorostyrene, α-methylstyrene, 2-vinylnaphthalene, 9-vinylanthracene, 9-vinylcarbazole, phenyl(meth)acrylate, benzyl(meth)acrylate, 2-phenoxyethyl (meth)acrylate, 2,4-diamino-6-((meth)acryloyloxy)ethyl-1,3,5-triazine, 2-naphthyl(meth)acrylate, 9-anthryl(meth) acrylate and (1-pyrenyl)methyl(meth)acrylate. Those monomers may be used alone or in combination thereof. Of those, styrene, 4-methylstyrene, 2-chlorostyrene, p-fluorostyrene or p-chlorostyrene is preferred.

The unit having an aromatic group is preferably a unit represented by the following general formula (2) because the abrasion resistance of an image can be further improved. In the general formula (2), $R_2$ represents a substituent in a phenyl group and "y" represents the number of the substituents. An alkyl group represented by $R_2$ in the general formula (2) may be, for example, a linear or branched alkyl group having about 1 to 6 carbon atoms. In addition, examples of the halogen atom may include a fluorine atom, a chlorine atom and bromine atom. "y" represents an integer of from 0 to 5, preferably 0 or 1, more preferably 0. When "y" represents 0, the unit represented by the general formula (2) has an unsubstituted phenyl group. It is more preferred that the unit represented by the general formula (2) be specifically a unit derived from at least one kind of monomer selected from the group consisting of: styrene; 4-methylstyrene; and 2-chlorostyrene.

(2)

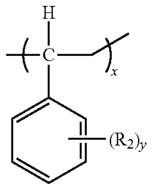

In the general formula (2), "x" represents the number of a repeating unit. $R_{2S}$ each independently represent an alkyl group or a halogen atom and "y" represents an integer of from 0 to 5.

The ratio (% by mass) of the unit having an aromatic group to the resin for forming the resin particle is preferably 20.0% by mass or more to 50.0% by mass or less, more preferably 30.0% by mass or more to 45.0% by mass or less with respect to the total mass of the resin. When the above-mentioned ratio (% by mass) of the unit having an aromatic group is 20.0% by mass or more, the strength of an ink layer is moderately improved and hence the abrasion resistance of an image can be further improved. Meanwhile, when the above-mentioned ratio (% by mass) of the unit having an aromatic group is 50.0% by mass or less, the viscosity of the ink layer in a recording median having applied thereto the ink is moderately kept and hence the abrasion resistance of the image can be further improved.

The resin for forming the resin particle includes the unit having a cyano group (also referred to as "nitrile group"). A monomer that is turned into the unit having a cyano group by polymerization is preferably a monomer, which has a cyano group and has one polymerizable functional group such as an ethylenically unsaturated bond in a molecule thereof, more preferably an ethylenically unsaturated monomer having a cyano group. Accordingly, the unit having a cyano group is more preferably a unit derived from an ethylenically unsaturated monomer having a cyano group.

Examples of the monomer for forming the unit having a cyano group may include acrylonitrile, methacrylonitrile, chloroacrylonitrile and 2-cyanoethyl(meth)acrylate. Those monomers may be used alone or in combination thereof. Acrylonitrile and methacrylonitrile are preferred because the color developability of an image can be further improved. That is, the unit having a cyano group is preferably a unit derived from at least one kind of monomer selected from the group consisting of acrylonitrile and methacrylonitrile. A unit and a monomer each having both of a cyano group and an aromatic group correspond to the above-mentioned unit having an aromatic group and monomer for forming the unit, respectively.

The ratio (% by mass) of the unit having a cyano group to the resin for forming the resin particle is preferably 5.0% by mass or more to 50.0% by mass or less, more preferably 10.0% by mass or more to 25.0% by mass or less with respect to the total mass of the resin. When the above-mentioned ratio (% by mass) of the unit having a cyano group is 5.0% by mass or more, a suppressing action on the localization of the coloring material easily occurs and hence the color developability of the image can be further improved. Meanwhile, when the above-mentioned ratio (% by mass) of the unit having a cyano group is 50.0% by mass or less, the localization of the coloring material caused by excessive crowding of the coloring material around the resin particle can be suppressed and hence the color developability of the image can be further improved.

The resin for forming the resin particle includes the unit derived from a (meth)acrylic acid ester having a branched alkyl group. The number of the carbon atoms of the branched alkyl group is preferably 3 or more to 10 or less, more preferably 4 or more to 8 or less. Examples of the branched alkyl group may include an isopropyl group, a sec-butyl group, an isobutyl group, a tert-butyl group and a 2-ethylhexyl group.

Examples of the (meth)acrylic acid ester having a branched alkyl group may include isobutyl(meth)acrylate, sec-butyl(meth)acrylate and a 2-ethylhexyl(meth)acrylate. Those (meth)acrylic acid esters may be used alone or in combination thereof. Of those, 2-ethylhexyl acrylate is preferred because the abrasion resistance of an image can be further improved. That is, the unit derived from a (meth) acrylic acid ester having a branched alkyl group is preferably a unit derived from 2-ethylhexyl acrylate. A (meth) acrylic acid ester having both of a branched alkyl group and an aromatic group corresponds to the above-mentioned monomer for forming the unit having an aromatic group. In addition, a (meth)acrylic acid ester having both of a branched alkyl group and a cyano group corresponds to the above-mentioned monomer for forming the unit having a cyano group.

The ratio (% by mass) of the unit derived from a (meth) acrylic acid ester having a branched alkyl group to the resin for forming the resin particle is preferably 10.0% by mass or more to 50.0% by mass or less with respect to the total mass of the resin. The above-mentioned ratio (% by mass) of the unit derived from a (meth)acrylic acid ester having a branched alkyl group is more preferably 10.0% by mass or more to 40.0% by mass or less, still more preferably 20.0% by mass or more to 35.0% by mass or less. When the above-mentioned ratio (% by mass) of the unit derived from a (meth)acrylic acid ester having a branched alkyl group is 10.0% by mass or more, the binding property of the resin particle to a recording medium is easily improved and hence the abrasion resistance of an image can be further improved. Meanwhile, when the above-mentioned ratio (% by mass) of the unit derived from a (meth)acrylic acid ester having a branched alkyl group is 50.0% by mass or less, the aggregation of the resin particles due to the entanglement of alkyl groups is moderately suppressed with ease and hence the color developability of the image can be further improved.

The resin for forming the resin particle includes the unit represented by the following general formula (1). In the following general formula (1), "n" represents the number of a repeating unit, $R_1$ represents an alkyl group and E represents the number of the repeating units of an ethylene oxide group and satisfies E≥1.

(1)

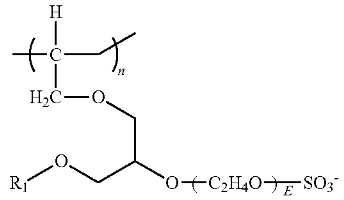

A compound represented by the following general formula (3) may be used as a monomer that is turned into the unit represented by the general formula (1) by polymerization. The compounds each represented by the general formula (3) may be used alone or in combination thereof. $R_1$ and E in the following general formula (3) are identical in meaning to those in the general formula (1).

(3)

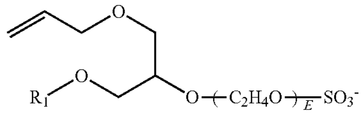

A vinyl group serving as a polymerizable functional group is bonded to a molecular terminal of the compound represented by the general formula (3). A hydrophilic moiety in the compound represented by the general formula (3) is an esterified moiety (sulfate; $—O—SO_3^-$) of polyoxyethylene ($—(C_2H_4O)_E—$) and sulfonic acid ($—SO_3^-$). In addition, a hydrophobic moiety in the compound represented by the general formula (3) is an alkyl group represented by $R_1$. The hydrophilic moiety and the hydrophobic moiety are bonded to each other through an ether group (—O—). The monomer that is turned into the unit represented by the general formula (1) may be specifically, for example, "a salt of [a sulfate esterification reaction product of ({a reaction product of 2-[(alkyloxy)methyl]oxirane and alkanol}·oxirane polyadduct, containing α-[1-(alkyloxy)-3-(allyloxy)propan-2-yl]-ω-hydroxypoly(oxyethylene) as a main component)]".

The alkyl group represented by $R_1$ in the general formula (1) may be any one of a linear alkyl group or a branched alkyl group and the number of its carbon atoms is preferably 9 or more to 14 or less. When the number of the carbon atoms is 9 or more, the aggregation of the resin particles in the ink and immediately after the application of the ink to a recording medium is easily alleviated by the steric hindrance of the alkyl group and hence the color developability of an image can be further improved. Meanwhile, when the number of the carbon atoms is 14 or less, the hydrophobicity of the alkyl group is moderately suppressed to alleviate the aggregation of the resin particles and hence the color developability of the image can be further improved.

The number of the repeating units of the ethylene oxide group represented by E in the general formula (1) is preferably 5 or more to 30 or less. When the number of the repeating units of the ethylene oxide group is 5 or more, the hydrophilicity of each of the resin particles is moderately kept to alleviate the aggregation of the resin particles and hence the color developability of the image can be further improved. Meanwhile, when the number of the repeating units of the ethylene oxide group is 30 or less, the aggregation of the resin particles in the ink and immediately after the application of the ink to the recording medium is easily alleviated and hence the color developability of the image can be further improved.

The ratio (% by mass) of the unit represented by the general formula (1) to the resin for forming the resin particle is preferably 1.0% by mass or more to 10.0% by mass or less, more preferably 2.0% by mass or more to 9.0% by mass or less with respect to the total mass of the resin. When the above-mentioned ratio (% by mass) of the unit represented by the general formula (1) is 1.0% by mass or more, the aggregation of the resin particles in the ink and immediately after the application of the ink to the recording medium can be alleviated to further improve the color developability of the image. In addition, when the above-mentioned ratio (% by mass) of the unit represented by the general formula (1) is 10.0% by mass or less, the hydrophilicity of each of the resin particles is moderately suppressed and hence the abrasion resistance of the image can be further improved.

The resin for forming the resin particle may include a unit except the above-mentioned respective units (other unit) as long as an effect exhibited by the present invention is not impaired. Examples of the other unit include a hydrophilic unit and a hydrophobic unit except the above-mentioned respective units.

The hydrophilic unit is a unit having a hydrophilic group such as an anionic group. Examples of the anionic group include a carboxylic acid group, a phenolic hydroxy group and a phosphoric acid ester group. A monomer that is turned into the unit having a hydrophilic group by polymerization is preferably a monomer, which has an anionic group and has one polymerizable functional group such as an ethylenically unsaturated bond in a molecule thereof, more preferably an ethylenically unsaturated monomer having an anionic group. Such monomers may be used alone or in combination thereof.

The ratio (% by mass) of the hydrophilic unit serving as the other unit to the resin for forming the resin particle is preferably 1.0% by mass or more to 15.0% by mass or less, more preferably 2.0% by mass or more to 10.0% by mass or less with respect to the total mass of the resin. When the above-mentioned ratio (% by mass) of the hydrophilic unit is 1.0% by mass or more, the ejection characteristic of the ink is easily improved. Meanwhile, when the above-mentioned ratio (% by mass) of the unit having an anionic group is 15.0% by mass or less, the hydrophilicity of the resin particle is moderately suppressed and hence the abrasion resistance of an image is easily improved.

A resin particle formed from a resin including a unit having a carboxylic acid group out of the hydrophilic units is preferred. The unit having a carboxylic acid group is a unit formed by polymerizing a monomer having a carboxylic acid group. The monomer having a carboxylic acid group is preferably a monomer, which has a carboxylic acid group and has one polymerizable functional group such as an ethylenically unsaturated bond in a molecule thereof, more preferably an ethylenically unsaturated monomer having a carboxylic acid group. Accordingly, the unit having a carboxylic acid group is more preferably a unit derived from an ethylenically unsaturated monomer having a carboxylic acid group. The carboxylic acid group may be an anhydride or a salt. Examples of the monomer for forming the unit having a carboxylic acid group may include: acidic monomers each having a carboxylic acid group, such as (meth)acrylic acid, itaconic acid, maleic acid and fumaric acid; and anionic monomers, such as anhydrides or salts of these acidic monomers. Examples of a cation for forming the salt of the acidic monomer may include lithium, sodium, potassium, ammonium, and organic ammonium ions. The ratio (% by mass) of the unit having a carboxylic acid group to the resin for forming the resin particle is preferably 1.0% by mass or more to 10.0% by mass or less, more preferably 2.0% by mass or more to 9.0% by mass or less with respect to the total mass of the resin.

The hydrophobic unit is a unit free of a hydrophilic group such as an anionic group. The hydrophobic unit may be formed by, for example, polymerizing a hydrophobic monomer free of a hydrophilic group such as an anionic group. Specific examples of the hydrophobic monomer may include (meth)acrylic acid ester-based monomers, such as methyl (meth)acrylate, ethyl(meth)acrylate and butyl(meth)acrylate. The hydrophobic monomers may be used alone or in combination thereof.

The ratio (% by mass) of the hydrophobic unit serving as the other unit to the resin for forming the resin particle is preferably 1.0% by mass or more to 40.0% by mass or less, more preferably 2.0% by mass or more to 20.0% by mass or less with respect to the total mass of the resin.

The ratio W1 (% by mass) of the unit having an aromatic group to the resin for forming the resin particle and the ratio W2 (% by mass) of the unit represented by the general formula (1) thereto preferably satisfy a relationship of $4.0 \leq W1/W2 \leq 40.0$. The above-mentioned W1 and W2 more preferably satisfy a relationship of $6.5 \leq W1/W2 \leq 10.0$. When the value of "W1/W2" is 4.0 times or more, an image recorded with the ink easily exhibits high abrasion resistance while maintaining high color-developing performance. Meanwhile, when the value of "W1/W2" is 40.0 times or less, the image easily exhibits high color developability while maintaining high abrasion resistance.

The content (% by mass) of the resin particle in the ink is preferably 1.0% by mass or more to 15.0% by mass or less, more preferably 1.0% by mass or more to 12.0% by mass or less with respect to the total mass of the ink. When the above-mentioned content of the resin particle is 1.0% by mass or more, the abrasion resistance of the image is easily improved. Meanwhile, when the above-mentioned content of the resin particle is 15.0% by mass or less, the color developability of the image is easily improved.

The glass transition temperature (° C.) of the resin particle is preferably 40° C. or more to 110° C. or less. When the glass transition temperature of the resin particle is 40° C. or more, the blocking resistance of the image is easily improved. Meanwhile, when the glass transition temperature of the resin particle is 110° C. or less, the binding property of the resin particle to a recording medium is strengthened and hence the abrasion resistance of the image is easily improved. The glass transition temperature of the resin particle is more preferably 45° C. or more to 90° C. or less, still more preferably 50° C. or more to 80° C. or less. The glass transition temperature of the resin particle may be measured with a differential scanning calorimeter (e.g., a product available under the product name "DSC Q1000" from TA Instruments, Inc.).

The acid value of the resin for forming the resin particle is preferably 5 mgKOH/g or more to 100 mgKOH/g or less. The weight-average molecular weight of the resin for forming the resin particle is preferably 1,000 or more to 2,000,000 or less. The volume-average particle diameter (volume-based 50% cumulative particle diameter D50) of the resin particle to be measured by a dynamic light scattering method is preferably 50 nm or more to 500 nm or less, more preferably 50 nm or more to 200 nm or less. The volume-based 50% cumulative particle diameter of the resin particle is the diameter of the particle in a particle diameter cumulative curve at which the ratio of the particle integrated from small particle diameters reaches 50% with respect to the total volume of the measured particle. The volume-average particle diameter of the resin particle may be measured with the above-mentioned particle size analyzer of a dynamic light scattering system and under the above-mentioned measurement conditions.

[Method of Producing Resin Particle]

The resin particle may be produced in accordance with a conventionally known method, such as an emulsion polymerization method, a mini-emulsion polymerization method, a seed polymerization method or a phase inversion emulsification method.

[Method of Verifying Resin Particle]

The configuration of a resin particle may be verified in accordance with a method described in the following sections (i) and (ii). A method including extracting a resin particle from an ink and analyzing and verifying the resin particle is described below; but a resin particle extracted from an aqueous dispersion liquid or the like may also be analyzed and verified in the same manner.

(i) Extraction of Resin Particle

A resin particle may be separated and extracted from an ink including the resin particle by a density gradient centrifugation method. The resin particle is separated and extracted based on a difference in sedimentation coefficient of components in a density gradient sedimentation velocity method out of the density gradient centrifugation methods. In addition, the resin particle is separated and extracted based on a difference in density of components in a density gradient sedimentation equilibrium method out of the density gradient centrifugation methods.

(ii) Analysis of Unit (Monomer) for Forming Resin

The resin particle to be used as a sample may be in a state of a dispersion liquid. In addition, a resin particle in a state of being dried and formed into a film may also be used as a sample. A resin to be used as a sample is subjected to elemental analysis by a combustion method. Separately from the foregoing, the fractionated resin is subjected to pretreatment by an acid decomposition (hydrofluoric acid addition) method or an alkali fusion method and then an inorganic component is quantitatively analyzed by inductively coupled plasma emission spectroscopy. In addition, the kinds and ratios of the units (monomers) for forming the resin may be known by nuclear magnetic resonance (NMR) spectroscopy.

[Water-Soluble Resin]

A water-soluble resin that can be dissolved in an aqueous medium may be incorporated into the ink. The content (% by mass) of the water-soluble resin in the ink is preferably 0.1% by mass or more to 20.0% by mass or less, more preferably 0.5% by mass or more to 15.0% by mass or less with respect to the total mass of the ink.

The water-soluble resin may be added to the ink (i) for stabilizing the dispersed state of the pigment, that is, as a resin dispersant or an aid therefor. In addition, the resin may be added to the ink (ii) for improving the various characteristics of an image to be recorded. Examples of the form of the water-soluble resin may include a block copolymer, a random copolymer, a graft copolymer and a combination thereof.

[Composition of Water-Soluble Resin]

Examples of the water-soluble resin may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred.

A resin having a hydrophilic unit and a hydrophobic unit as its structural units is preferred as the acrylic resin. Of those, a resin having a hydrophilic unit derived from (meth)acrylic acid and a hydrophobic unit derived from at least one of a monomer having an aromatic ring and a (meth)acrylic acid ester-based monomer is preferred. A resin having a hydrophilic unit derived from (meth)acrylic acid and a hydrophobic unit derived from at least one monomer of styrene and α-methylstyrene is particularly preferred. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, α-methylstyrene and benzyl(meth)acrylate; and (meth)acrylic acid ester-based monomers, such as methyl (meth)acrylate, butyl(meth)acrylate and 2-ethylhexyl(meth)acrylate.

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

[Properties of Water-Soluble Resin]

The phrase "resin is water-soluble" as used herein means that when the resin is neutralized with an alkali whose amount is equivalent to its acid value, the resin is present in an aqueous medium under a state in which the resin does not form any particle whose particle diameter may be measured by a dynamic light scattering method. Whether or not the resin is water-soluble can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, when no particle having a particle diameter is measured at the time of the measurement of the particle diameter of the resin in the sample solution by the dynamic light scattering method, the resin can be judged to be water-soluble. Measurement conditions at this time may be set, for example, as follows: SetZero: 30 seconds; number of times of measurement: 3; and measurement time: 180 seconds. In addition, a particle size analyzer based on the dynamic light scattering method (e.g., an analyzer available under the product name "UPA-EX150" from Nikkiso Co., Ltd.) or the like may be used as a particle size distribution measuring device. Of course, the particle size distribution measuring device to be used, the measurement conditions and the like are not limited to the foregoing.

The acid value of the water-soluble resin is preferably 100 mgKOH/g or more to 250 mgKOH/g or less. The weight-average molecular weight of the water-soluble resin is preferably 3,000 or more to 15,000 or less.

[Wax Particle]

A particle formed of a wax (wax particle) may be incorporated into the ink. The use of the ink including the wax particle can record an image further improved in abrasion resistance. The wax in this specification may be a composition blended with a component except the wax or may be the wax itself. The wax particle may be dispersed with a dispersant, such as a surfactant or a resin. The waxes may be used alone or in combination thereof. The content (% by mass) of the wax particle in the ink is preferably 0.1% by mass or more to 10.0% by mass or less, more preferably 1.0% by mass or more to 5.0% by mass or less with respect to the total mass of the ink.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present invention, the waxes in a broad sense may each be used without any particular limitation. The waxes in a broad sense may be classified into natural waxes, synthetic waxes, blends thereof (blended waxes) and modified products thereof (modified waxes), Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and poly olefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. The above-mentioned waxes may be used alone or in combination thereof. The wax is preferably at least one kind selected from the group consisting of: a microcrystalline wax; a Fischer-Tropsch wax; a polyolefin wax; a paraffin wax; and modified products and blends thereof. Of those, a blend of a plurality of kinds of waxes is more preferred and a blend of a petroleum-based wax and a synthetic wax is particularly preferred.

The wax is preferably a solid at normal temperature (25° C.). The melting point (° C.) of the wax is preferably 40° C. or more to 120° C. or less, more preferably 50° C. or more to 100° C. or less. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

[Aqueous Medium]

The ink is an aqueous ink including at least water as an aqueous medium. An aqueous medium that is the water or a mixed solvent of the water and a water-soluble organic solvent may be incorporated into the ink. Deionized water or ion-exchanged water is preferably used as the water. The content (% by mass) of the water in the aqueous ink is preferably 50.0% by mass or more to 95.0% by mass or less with respect to the total mass of the ink. In addition, the content (% by mass) of the water-soluble organic solvent in the aqueous ink is preferably 2.0% by mass or more to 40.0% by mass or less with respect to the total mass of the ink. Solvents that may be used in an ink for ink jet, such as alcohols, (poly)alkylene glycols, glycol ethers, nitrogen-containing compounds and sulfur-containing compounds, may each be used as the water-soluble organic solvent. The water-soluble organic solvents may be used alone or in combination thereof.

[Polyethylene Glycol whose Number of Ethylene Oxide Groups is 4 or More]

The ink preferably includes, as a water-soluble organic solvent, polyethylene glycol (sometimes abbreviated as "PEG") whose number of ethylene oxide groups (n2; sometimes abbreviated as "EO number") is 4 or more. In addition to the foregoing, the number of the ethylene oxide groups (sometimes abbreviated as "n1") of the unit represented by the general formula (1) in the resin for forming the resin particle described above and the EO number (n2) of the polyethylene glycol preferably satisfy a relationship of $0.2 \leq n1/n2 \leq 5.0$. When such relationship is satisfied, an interaction between the resin particle and the polyethylene glycol becomes stronger to cause the resin particle and the polyethylene glycol to be present close to each other. Accordingly, an accelerating action of the polyethylene glycol on film formation by the resin particle can occur to further improve the abrasion resistance of an image.

Although the term "water-soluble organic solvent" typically means a liquid, in the present invention, polyethylene glycol that is a solid at 25° C. (normal temperature) is also included in the category of the water-soluble organic solvent. As the number-average molecular weight of the polyethylene glycol increases, the polyethylene glycol becomes a solid. For example, polyethylene glycol having a number-average molecular weight of 600 is a liquid at 25° C. and polyethylene glycol having a number-average molecular weight of 1,000 is a solid at 25° C. The content (% by mass) of the polyethylene glycol whose number of ethylene oxide groups is 4 or more in the ink is preferably 1.0% by mass or more to 20.0% by mass or less with respect to the total mass of the ink.

The number (n2) of the ethylene oxide groups of the polyethylene glycol is preferably 4 or more to 45 or less, more preferably 6 or more to 45 or less. When the number (n2) of the ethylene oxide groups is 4 or more to 45 or less, an interaction between the polyethylene glycol and the resin particle becomes stronger to enhance an accelerating action on film formation by the resin particle and hence the abrasion resistance of the image can be further improved.

When the resin particle and the polyethylene glycol whose number of ethylene oxide groups is 4 or more described above coexist, such setting as described below is preferred. That is, the alkyl group represented by $R_1$ in the general formula (1) may be any one of a linear alkyl group or a branched alkyl group and the number of its carbon atoms is preferably 9 or more to 14 or less. When the number of the carbon atoms is 9 or more, the resin particle can be suppressed from becoming excessively hydrophilic at the time of its interaction with the polyethylene glycol and hence the abrasion resistance of the image can be improved. Meanwhile, when the number of the carbon atoms is 14 or less, the steric hindrance of the alkyl group does not occur remarkably. Accordingly, an interaction between the resin particle and the polyethylene glycol easily occurs and hence an accelerating action on film formation by the resin particle can occur to improve the abrasion resistance of the image.

When the resin particle and the polyethylene glycol whose number of ethylene oxide groups is 4 or more described above coexist, such setting as described below is preferred. That is, the number (n1) of the repeating units of the ethylene oxide group represented by E in the general formula (1) is preferably 5 or more to 30 or less. When the number of the repeating units of the ethylene oxide group is 5 or more, an interaction between the resin particle and the polyethylene glycol easily occurs and hence an accelerating action on film formation by the resin particle can occur to improve the abrasion resistance of the image. Meanwhile, when the number of the repeating units of the ethylene oxide group is 30 or less, the resin particle can be suppressed from becoming excessively hydrophilic at the time of its interaction with the polyethylene glycol and hence the abrasion resistance of the image can be improved.

When the resin particle and the polyethylene glycol whose number of ethylene oxide groups is 4 or more described above coexist, such setting as described below is preferred. That is, the ratio (% by mass) of the unit represented by the general formula (1) to the resin particle is preferably 1.0% by mass or more to 10.0% by mass or less with respect to the total mass of the resin. The above-mentioned ratio is more preferably 2.0% by mass or more to 9.0% by mass or less. When the above-mentioned ratio (% by mass) of the unit represented by the general formula (1) is 1.0% by mass or more, the resin particle easily interacts with the polyethylene glycol and hence the abrasion resistance of the image can be further improved. Meanwhile, when the above-mentioned ratio (% by mass) of the unit represented by the general formula (1) is 10.0% by mass or less, the hydrophilicity of the resin particle is moderately suppressed and hence the abrasion resistance of the image can be further improved.

When the resin particle and the polyethylene glycol whose number of ethylene oxide groups is 4 or more described above coexist, such setting as described below is preferred. That is, the mass ratio of the content (% by mass) of the resin particle in the ink to the content (% by mass) of the polyethylene glycol whose number of ethylene oxide groups is 4 or more is preferably 0.3 times or more to 5.0 times or less. When the above-mentioned mass ratio is 0.3 times or more, a reduction in strength of an ink layer due to an excessive amount of the polyethylene glycol hardly occurs and hence the abrasion resistance of the image can be further improved. Meanwhile, when the above-mentioned mass ratio is 5.0 times or less, the polyethylene glycol is moderately present to facilitate the occurrence of an accelerating action on film formation by the resin particle and hence the abrasion resistance of the image can be further improved.

[Water-Soluble Hydrocarbon Compound]

The water-soluble organic solvent to be incorporated into the ink preferably contains a specific water-soluble hydrocarbon compound. The water-soluble hydrocarbon compound is a compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

In the present invention, a hydrocarbon compound in the state of being dissolved in water at a content of the compound in the ink at 25° C. is defined as being "water-soluble". That is, the solubility of the compound in water at 25° C. is larger than the content thereof in the ink. The fact that the hydrocarbon chain is interrupted by a sulfonyl group or an ether group means that a sulfonyl group ($—S(=O)_2—$) or an ether group (—O—) is present in the middle of the hydrocarbon chain. The water-soluble hydrocarbon compound has hydrogen-bonding groups, such as a hydroxy group, an amino group, an anionic group, a sulfonyl group and an ether group. Accordingly, the use of the ink including the hydrocarbon compound can suppress the cockling or curl of a recording medium having recorded thereon an image. A general hydrocarbon compound having a hydrocarbon chain having a relatively small number of carbon atoms (3 or 4 carbon atoms) tends to have a small molecular weight and hence have a low vapor pressure. However, the above-mentioned water-soluble hydrocarbon compound has a hydrogen-bonding anionic group or its hydrocarbon chain is interrupted by a sulfonyl group. Accordingly, the compound hardly evaporates owing to an intermolecular or intramolecular interaction and hence remains between fibers for forming the recording medium to exhibit a suppressing action on the cockling or the curl. The content (% by mass) of the water-soluble hydrocarbon compound in the ink is preferably 1.0% by mass or more to 20.0% by mass or less with respect to the total mass of the ink.

The number of the carbon atoms of the hydrocarbon chain for forming the water-soluble hydrocarbon compound is preferably 3 or more to 50 or less, more preferably 3 or more to 10 or less. Examples of the anionic group may include a sulfonic acid group and a carboxylic acid group. Specific examples of the water-soluble hydrocarbon compound may include: alkanediols, such as 1,5-pentanediol and 1,6-hexanediol; amino acids, such as alanine, β-alanine, trimethylglycine, amidosulfuric acid (alias: sulfamic acid), aminomethanesulfonic acid, taurine (alias: 2-aminoethanesulfonic acid), carbamic acid, glycine, aspartic acid, glutamic acid, sulfanilic acid or salts of any of the acids described above, phenylalanine, leucine, isoleucine, threonine, tryptophan, valine, methionine, lysine and arginine; sulfonyl compounds such as bis(2-hydroxyethyl) sulfone; alkylene glycols, such as triethylene glycol, tetraethylene glycol, tripropylene glycol and a polyethylene glycol having a number-average molecular weight of from about 200 to about 1,000; and sugars, such as sorbitol, D-sorbitol, xylitol, trehalose, fructose and D(+)-xylose. The water-soluble hydrocarbon compounds may be used alone or in combination thereof.

[Other Component]

The ink may include various additives, such as an anti-foaming agent, a surfactant, a pH adjustor, a viscosity modifier, a rust inhibitor, an antiseptic, a fungicide, an antioxidant and an anti-reducing agent, as required in addition to the above-mentioned components. However, the ink is preferably free of the reactant to be used in the reaction liquid as described later.

[Physical Properties of Ink]

The ink is an aqueous ink to be applied to an ink jet system. Accordingly, from the viewpoint of reliability, it is preferred that the physical property values of the ink be appropriately controlled. Specifically, the surface tension of the ink at 25° C. is preferably 20 mN/m or more to 60 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

<Ink Set>

The above-mentioned ink may be used as an ink set in combination with an aqueous reaction liquid (hereinafter sometimes described as "reaction liquid") containing a reactant that reacts with the ink.

Reaction Liquid

[Reactant]

The reaction liquid is brought into contact with the ink to react with the ink, to thereby aggregate components (a resin, a surfactant, and a component having an anionic group such as a self-dispersible pigment) in the ink. The reaction liquid contains the reactant. When the reactant is present, at the time of contact between the ink and the reactant in the recording medium, the state of presence of the component having am anionic group in the ink is destabilized and hence the aggregation of the ink can be accelerated. Examples of the reactant may include: a polyvalent metal ion; a cationic component such as a cationic resin; and an organic acid. The reactants may be used alone or in combination thereof.

Examples of the polyvalent metal ion forming a polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. A water-soluble polyvalent metal salt (which may be a hydrate) made up of the polyvalent metal ion and an anion bonded to each other may be used to incorporate the polyvalent metal ion into the reaction liquid. Examples of such anion may include: inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When the polyvalent metal ion is used as the reactant, its content (% by mass) in terms of polyvalent metal salt in the reaction liquid is preferably 1.0% by mass or more to 20.0% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The reaction liquid containing the organic acid has a buffering capacity in an acidic region (at a of less than 7.0, preferably at a pH of from 2.0 to 5.0) to efficiently turn the anionic group of the components present in the ink into an acid type, to thereby aggregate the ink. Examples of the organic acid may include: monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids, such as citric acid and trimellitic acid, and salts and hydrogen salts thereof; and tetracarboxylic acids such as pyromellitic acid, and salts and hydrogen salts thereof. When the organic acid is used as the reactant, the content (% by mass) of the organic acid in the reaction liquid is preferably 1.0% by mass or more to 50.0% by mass or less with respect to the total mass of the reaction liquid.

Examples of the canonic resin may include resins having structures of primary to tertiary amines and resins having structures of quaternary ammonium salts. Specific examples thereof may include resins having structures of, for example, vinylamine, allylamine, vinylpyridine, dimethylaminoethyl methacrylate, ethylene imine, guanidine, diallyldimethylammonium chloride and an alkylamine-epichlorohydrin condensate. To improve solubility in the reaction liquid, the cationic resin and an acidic compound may be used in combination or the cationic resin may be subjected to quaternization treatment. When the cationic resin is used as the reactant, the content (% by mass) of the cationic resin in the reaction liquid is preferably 0.1% by mass or more to 10.0% by mass or less with respect to the total mass of the reaction liquid.

An ink set including the following components is preferred: a reaction liquid containing a polyvalent metal ion as a reactant; and an ink including a coloring material dispersed by the action of a carboxylic acid group and a resin particle formed from a resin including a unit having a carboxylic acid group in addition to the above-mentioned 4 kinds of units. The ink set having such configuration can further improve the abrasion resistance of an image and can suppress the unevenness of the image. The polyvalent metal ion in the reaction liquid reacts with the component having a carboxylic acid group to strongly aggregate the object. In the case where each of the resin particle and the coloring material in the ink has a carboxylic acid group, when the ink and the reaction liquid are brought into contact with each other, the aggregation rates of the coloring material and the resin particle easily become equal to each other. Thus, a state in which the aggregation of only one of the resin particle or the coloring material is completed first and hence the resin particle and the coloring material are present while being separated from each other is prevented and hence the resin particle and the coloring material aggregate under the state of being moderately mixed with each other. Accordingly, an image showing higher abrasion resistance is recorded.

In addition, a cyano group in the resin for forming the resin particle is a polarized group having high polarity and hence easily interacts with each of the carboxylic acid groups of the resin for forming the resin particle and the coloring material. The interaction causes the cyano group to surround the periphery of the carboxylic acid group. Accordingly, the rate of the aggregation of the ink caused by a reaction between the polyvalent metal ion and the carboxylic acid group when the ink is brought into contact with the reaction liquid is appropriately suppressed and hence the aggregation gently advances. Thus, the aggregation is prevented from advancing excessively in a partial manner and hence irregular formation of the aggregate of the ink is suppressed. In addition, a sulfonic acid group in the unit represented by the general formula (1) of the resin for forming the resin particle shows a suppressing action on the growth of the aggregate of the ink because the group easily undergoes ionic dissociation and hardly reacts with the polyvalent metal ion as compared to a carboxylic acid group. Accordingly, the use of an ink including a resin particle formed from a resin having a sulfonic acid group suppresses the irregular formation of the aggregate of the ink. As a result of the foregoing, the unevenness of the image can be suppressed.

When an organic acid is used as a reactant instead of the polyvalent metal ion, the unevenness of the image is somewhat difficult to suppress, though the abrasion resistance of the image is improved. In addition, when a cationic resin such as polyallylamine is used as a reactant instead of the polyvalent metal ion, a further improving effect on the abrasion resistance of the image is hardly obtained, though the unevenness of the image can be suppressed. However, the polyvalent metal ion and the cationic resin or the organic acid may be used in combination as long as the effect of the present invention is not impaired.

[Aqueous Medium]

The reaction liquid is an aqueous reaction liquid containing at least water as an aqueous medium. Examples of the aqueous medium to be used in the reaction liquid may include the same examples as those of an aqueous medium that can be incorporated into the ink to be described above. The content (% by mass) of the water-soluble organic solvent in the reaction liquid is preferably 1.0% by mass or more to 45.0% by mass or less with respect to the total mass of the reaction liquid. The water-soluble organic solvent preferably contains a specific water-soluble hydrocarbon compound to be described above. The content (% by mass) of the water-soluble hydrocarbon compound in the reaction liquid is preferably 1.0% by mass or more to 20.0% by mass or less with respect to the total mass of the reaction liquid. In addition, the content (% by mass) of the water in the reaction liquid is preferably 50.0% by mass or more to 95.0% by mass or less with respect to the total mass of the reaction liquid.

[Other Component]

The reaction liquid may contain various other components as required. Examples of the other components may include the same examples as those of other components that can be incorporated into the ink to be described above.

[Physical Properties of Reaction Liquid]

The reaction liquid is an aqueous reaction liquid to be applied to an ink jet system. Accordingly, from the viewpoint of reliability, it is preferred that the physical properly values of the reaction liquid be appropriately controlled. Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

<Ink Jet Recording Method and Ink Jet Recording Apparatus>

The ink jet recording method according to one embodiment of the present invention and an ink jet recording apparatus that may be suitably used in the ink jet recording method are described below with reference to the drawings. The ink jet recording method of this embodiment is a method including ejecting the above-mentioned ink from a recording head of an ink jet system to record an image on a recording medium. The inkjet recording apparatus of the present embodiment is provided with the above-mentioned ink and an inkjet recording head for ejecting the ink.

FIG. 1 is a schematic view for illustrating an example of the schematic configuration of an ink jet recording apparatus 100 of this embodiment. The ink jet recording apparatus 100 is an ink jet recording apparatus that records an image on a recording medium with a reaction liquid containing a reactant that reacts with an ink and the ink. Herein, description is given by taking a case in which the reaction liquid is used together with the ink as an example. However, the reaction liquid may not be used. An X-direction, a Y-direction and a Z-direction represent the width direction (total length direction), depth direction and height direction of the ink jet recording apparatus, respectively. The recording medium is conveyed in the X-direction.

The ink jet recording apparatus 100 of the embodiment illustrated in FIG. 1 includes: a recording portion 1000; a heating portion 2000; a fixing portion 3000; and a sheet delivery portion 4000. In the recording portion 1000, various liquids are applied to a recording medium 1100, which has been conveyed from a sheet feeding device 1400 by a conveying member 1300, by a liquid applying device 1200. In the heating portion 2000, the liquid components of an image formed by the liquids applied to the recording medium 1100 are evaporated and dried by heating with a heating device 2100. In the fixing portion 3000, a fixing member 3100 is brought into contact with the region of the recording medium 1100 including the image to heat the image, to thereby accelerate the fixation of the image to the recording medium 1100. After that, the recording medium 1100 is conveyed by the conveying member 4100 of the sheet delivery portion 4000 and is loaded and stored in a recording medium storage portion 4200. Herein, description is given by taking a configuration including the heating portion 2000 and the fixing portion 3000 as an example. However, the heating portion or the fixing portion may be omitted in accordance with recording conditions (e.g., the kinds of the ink and the recording medium and a recording speed). In Examples to be described later, recording was performed without use of the heating portion 2000 and the fixing portion 3000.

Any medium may be used as the recording medium 1100. For example, such recording media each having ink absorbability (permeability) as described below may each be used as the recording medium 1100: a recording medium free of a coating layer, such as plain paper, uncoated paper or synthetic paper; and a recording medium including a coating layer, such as glossy paper or art paper. In addition, a recording medium that does not have permeability like a film or a sheet formed from a resin material, such as polyvinyl chloride (PVC) or polyethylene terephthalate (PET), may be used. The basis weight ($g/m^2$) of the recording medium 1100 is preferably 30 $g/m^2$ or more to 500 $g/m^2$ or less, more preferably 50 $g/m^2$ or more to 450 $g/m^2$ or less.

[Recording Portion]

The recording portion 1000 includes the liquid applying device 1200. The liquid applying device 1200 includes a reaction liquid applying device 1201 and an ink applying device 1202. The reaction liquid applying device 1201 illustrated in FIG. 1 is an example of a unit using an ejection head of an ink jet system. The reaction liquid applying device may be formed by utilizing a gravure coater, an offset coater, a die coater, a blade coater or the like in addition to the ejection head. The reaction liquid may be applied by the reaction liquid applying device 1201 before the application of the ink or may be applied after the ink application as long as the liquid can be brought into contact with the ink on the recording medium 1100. However, to record a high-quality image on various recording media having different liquid-absorbing characteristics, the reaction liquid is preferably applied before the application of the ink. An ejection head (recording head) of an ink jet system is used as the ink applying device 1202. Examples of the ejection system of the ejection head serving as the liquid applying device 1200 include: a system including causing film boiling in a liquid with an electro-thermal converter to form air bubbles, to thereby eject the liquid; and a system including ejecting the liquid with an electro-mechanical converter.

The liquid applying device 1200 is a line head arranged in the Y-direction in an extended manner and its ejection orifices are arrayed in a range covering the image recording region of the recording medium having the maximum usable width. The ejection head has an ejection orifice surface (not shown) having formed therein ejection orifices on its lower side (recording medium 1100 side). The ejection orifice surface faces the recording medium 1100 with a minute distance of about several millimeters therebetween.

The plurality of ink applying devices 1202 may be arranged for applying inks of respective colors to the recording medium 1100. For example, when respective color images are recorded with a yellow ink, a magenta ink, a cyan ink and a black ink, the four ink applying devices 1202 that eject the above-mentioned four kinds of inks are arranged side by side in the X-direction. The ink and the reaction liquid are hereinafter sometimes collectively referred to as "liquids".

Figure 2:
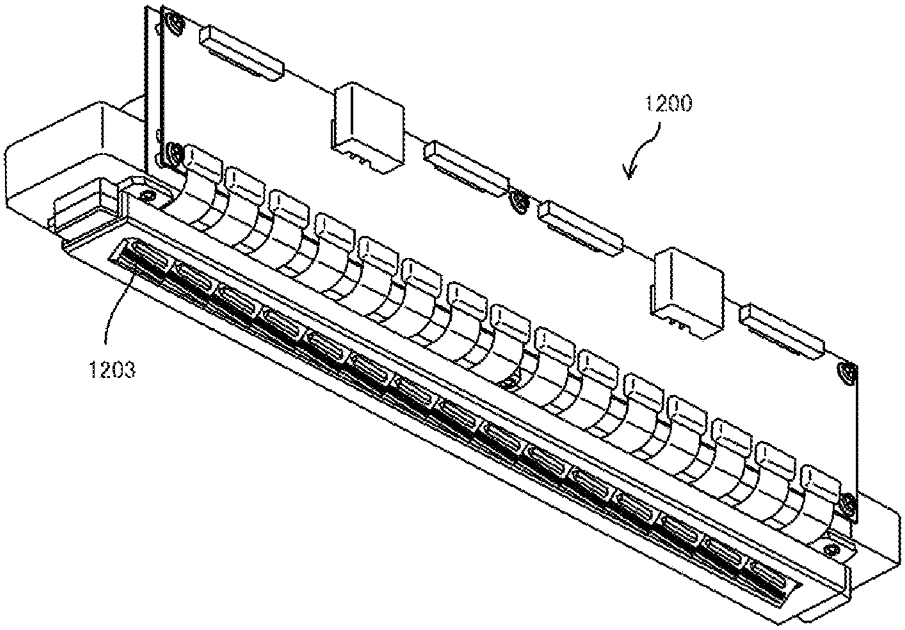
FIG. 2 is a perspective view tier illustrating an example of a liquid applying device.

FIG. 2 is a perspective view for illustrating an example of the liquid applying device. The liquid applying device 1200 illustrated in FIG. 2 is a line head and a plurality of ejection element substrates 1203 having arranged therein ejection orifice arrays are linearly arrayed. The ejection element substrates 1203 each have arrayed therein a plurality of ejection orifice arrays.

[Conveyance System]

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200. The respective liquid applying devices receive the image signal of recording data to apply the required reaction liquid and ink to the respective positions. Although the conveying member 1300 in the form of a conveying belt is illustrated in FIG. 1, for example, a spur or a conveying cylinder may be utilized as long as the spur or the cylinder has a function of conveying the recording medium 1100. A member that can fix the recording medium 1100 may be used as the conveying member 1300 for improving conveyance accuracy. Specific examples thereof may include: an approach including arranging holes in the conveying member 1300 and sucking the recording medium 1100 from its rear surface side to fix the recording medium; and an approach including forming the conveying member 1300 from an appropriate material and electrostatically adsorbing the recording medium 1100 to fix the recording medium.

[Heating Portion]

As illustrated in FIG. 1, the heating portion 2000 includes the heating device 2100 and a conveying member 2200. The recording medium 1100 having recorded thereon the image through the application of the reaction liquid and the ink is heated by the heating device 2100 while being conveyed by the conveying member 2200. Thus, the liquid components of the image are evaporated and dried. The recording method preferably further includes, between the ink applying step and the fixing step, a drying step of subjecting the recording medium having applied thereto the ink to non-contact heating to dry the ink. The presence of such drying step can effectively suppress the deformation (cockling or curl) of the recording medium 1100.

The heating device 2100 may have any configuration as long as the device can heat the recording medium 1100. Conventionally known various devices, such as a warm-air dryer and a heater, may each be used. Of those, a non-contact-type heater, such as a heating wire and an infrared heater, is preferably utilized in terms of safety and energy efficiency. In addition, the utilization of the following mechanism easily improves the drying efficiency: the mechanism has built therein a fan for jetting a heated gas on the recording medium 1100 and blows warm air thereto.

With regard to a method for the heating, the recording medium 1100 may be heated from the side of the surface having applied thereto the reaction liquid and the ink, may be heated from its rear surface side or may be heated from both the surfaces. A heating function may be imparted to the conveying member 2200. Although the conveying member 2200 in the form of a conveying belt is illustrated in FIG. 1, for example, a spur or a conveying cylinder may be utilized as long as the spur or the cylinder has a function of conveying the recording medium 1100.

[Fixing Portion]

As illustrated in FIG. 1, in the fixing portion 3000, the recording medium 1100 is conveyed by a conveying member 3200. In addition, the fixing member 3100 is brought into contact with the recording medium 1100 under a state in which the recording medium is pressurized to heat the liquids applied to the recording medium 1100, such as the reaction liquid and the ink. Thus, an image can be fixed to the recording medium 1100. After the permeation of the liquid components of the reaction liquid and the ink into the recording medium 1100 having recorded thereon the image and the evaporation thereof from the recording medium 1100 by their passing through the heating portion 2000, the reaction liquid and the ink are fixed in the fixing portion 3000 to complete the image. When the recording medium 1100 is heated and pressurized under the state of being sandwiched between the fixing member 3100 and the conveying member 3200, the image on the recording medium 1100 and the fixing member 3100 are brought into close contact with each other and hence the image is fixed to the recording medium. When a liquid such as an ink containing the resin particle and a coloring material is used, the resin particle is softened through heating mainly by the fixing portion 3000 to form a film and hence the coloring material can be bound onto the recording medium 1100.

A method of heating the fixing member 3100 may be, for example, a system including arranging a heat source such as a halogen heater in each of rollers that drive the fixing member 3100 serving as a fixing belt to heat the member. In addition, the method may be, for example, a system including arranging a heat source such as an infrared heater at a site different from the fixing member 3100 to heat the member. Further, those systems may be combined with each other.

[Sheet Delivery Portion]

The recording medium 1100 after the image recording is stored in the sheet delivery portion 4000 (FIG. 1). Specifically, the recording medium 1100 after the recording is conveyed by the conveying member 4100 to be finally stored under the state of being loaded in the recording medium storage portion 4200. The two or more recording medium storage portions 4200 may be arranged for, for example, separately storing different recorded products.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass, unless otherwise stated.

Preparation of Reaction Liquid (Pigment Dispersion Liquid 1)

An aqueous solution obtained by dissolving 5.0 g of concentrated hydrochloric acid in 5.5 g of water was brought into the state of being cooled to 5° C., followed by the addition of 1.5 g of 4-aminophthalic acid to the solution. Next, a container containing the aqueous solution was loaded into an ice bath, and while the solution was stirred so that its temperature was held at 10° C. or less, a solution obtained by dissolving 0.9 g of sodium nitrite in 9.0 g of water at 5° C. was added thereto. After the mixture had been stirred for 15 minutes, 6.0 g of pigment (carbon black) was added to the mixture under stirring and the whole was further stirred for 15 minutes to provide a slurry. The resultant slurry was filtered with filter paper (product name: "STANDARD FILTER PAPER No, 2," manufactured by Advantec), and particle remaining on the filter paper were sufficiently washed with water and dried in an oven at 110° C. After that, a sodium ion was substituted with a potassium ion by an ion exchange method. Thus, a self-dispersible pigment in which a $—C_6H_2—(COOK)_2$ group was bonded to the particle surface of the pigment (carbon black) was obtained. The pigment content was adjusted by adding an appropriate amount of pure water to obtain a pigment dispersion 1 having a pigment (carbon black) content of 10.0%.

(Pigment Dispersion Liquid 2)

A styrene-ethyl acrylate-acrylic acid copolymer (resin 1) having an acid value of 150 mg KOH/g and a weight-average molecular weight of 8,000 was prepared. 20.0 Parts of the resin 1 was neutralized with potassium hydroxide whose molar amount was equivalent to its acid value. In addition, an appropriate amount of pure water was added to the neutralized product to prepare an aqueous solution of the resin 1 in which the content of the resin (solid content) was 20.0%. 10.0 Parts of a pigment (C.I. Pigment Blue 15:3), 15.0 parts of the aqueous solution of the resin 1 and 75.0 parts of pure water were mixed to provide a mixture. The resulting mixture and 200 parts of 0.3 mm diameter zirconia bead were placed in a batch-type vertical sand mill (manufactured by AIMEX) and dispersed for 5 hours while cooling in water. After centrifugation to remove a coarse particle, the product was pressure filtered through a cellulose acetate filter having a pore size of 3.0 μm (manufactured by Advantec). In this way, pigment dispersion liquid 2 in which the content of the pigment (C.I. Pigment Blue 15:3) was 10.0% and the content of the resin dispersant (resin 1) was 3.0%, was prepared.

(Pigment Dispersion Liquid 3)

A pigment dispersion liquid 3 having a pigment (solid solution pigment of C.I. Pigment Violet 19 and C.I. Pigment Red 122) content of 10.0% and a resin dispersant (Resin 1) content of 3.0% was prepared by the same procedure as that of the above-mentioned pigment dispersion liquid 2 except that the pigment was changed to solid solution pigment of C.I. Pigment Violet 19 and C.I. Pigment Red 122.

(Pigment Dispersion Liquid 4)

A pigment dispersion liquid 4 having a pigment (C.I. Pigment Red 150) content of 10.0% and a resin dispersant (Resin 1) content of 3.0% was prepared by the same procedure as that of the above-mentioned pigment dispersion liquid 2 except that the pigment was changed to C.I. Pigment Red 150.

(Pigment Dispersion Liquid 5)

A pigment dispersion liquid 5 having a pigment (C.I. Pigment Yellow 74) content of 10.0% and a resin dispersant (Resin 1) content of 3.0% was prepared by the same procedure as that of the above-mentioned pigment dispersion liquid 2 except that the pigment was changed to C.I. Pigment Yellow 74.

(Pigment Dispersion Liquid 6)

A pigment dispersion liquid 6 having a pigment (carbon black) content of 10.0% and a resin dispersant (Resin 1) content of 3.0% was prepared by the same procedure as that of the above-mentioned pigment dispersion liquid 2 except that the pigment was changed to carbon black.

Preparation of Resin Particles (Monomers for Forming Units Each Represented by General Formula (1))

Monomers for forming units each represented by the general formula (1) were produced by an ordinary method. The produced monomers (Compounds 1 to 10) for forming units each represented by the general formula (1) are shown in Table 1. The monomers for forming units each represented by the general formula (1) are compounds each represented by the following general formula (3-1). $R_1$ and E in the general formula (3-1) are identical in meaning to those in the general formula (1).

(3-1)

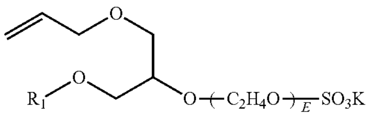

TABLE 1

| Compounds represented by general formula (3-1) | | |
|---|---|---|
| Compound | $R_1$ | E |
| 1 | $C_{11}H_{23}$ | 4 |
| 2 | $C_{11}H_{23}$ | 5 |
| 3 | $C_{11}H_{23}$ | 10 |
| 4 | $C_8H_{17}$ | 10 |
| 5 | $C_9H_{19}$ | 10 |
| 6 | $C_{14}H_{29}$ | 10 |
| 7 | $C_{15}H_{31}$ | 10 |
| 8 | $C_{11}H_{23}$ | 30 |
| 9 | $C_{11}H_{23}$ | 31 |
| 10 | $C_{15}H_{31}$ | 31 |

(Resin Particles 1 to 44)

Styrene (St), 4-methylstyrene (4MSt), 2-chlorostyrene (2CSt), α-methylstyrene (αMSt) and 2-vinylnaphthalene (2VNA) were each prepared as a monomer that is turned into the unit having an aromatic group in the resin for forming the resin particle. In addition, acrylonitrile (AN), methacrylonitrile (MAN) and 2-chloroacrylonitrile (2CAN) were each prepared as a monomer that is turned into the unit having a cyano group in the resin for forming the resin particle. Similarly, 2-ethylhexyl acrylate (2EHA), 2-ethylhexyl methacrylate (2EHMA), isobutyl methacrylate (iBMA) and sec-butyl acrylate (sBA) were each prepared as a (meth)acrylic acid ester having a branched alkyl group. Further, ethyl methacrylate (EMA) and methacrylic acid (MAA) were each prepared as a monomer that is turned into the other unit in the resin for forming the resin particle.

A reaction vessel mounted with a stirring device was set in a hot water bath. 1,178 Parts of water was loaded into the reaction vessel and a temperature therein was held at 70° C. Monomers whose loading amounts (unit: part(s)) were shown in Table 2-1 were mixed to prepare a monomer mixed liquid. In addition. 1.9 parts of potassium persulfate and 659 parts of water were mixed to prepare an aqueous solution of a polymerization initiator. The monomer mixed liquid and the aqueous solution of the polymerization initiator were dropped in parallel into the reaction vessel over 60 minutes. After the completion of the dropping, the mixture was further subjected to a reaction for 30 minutes while being continuously stirred. Thus, resin particles shown in Table 2-2 were synthesized. After that, an appropriate amount of an 8 mol/L aqueous solution of potassium hydroxide was added into the reaction vessel to adjust the pH of the liquid to 8.5. The water content of the liquid was adjusted to provide an aqueous dispersion liquid of each of the resin particles in which the content and volume-average particle diameter (volume-based 50% cumulative particle diameter D50) of the resin particle were 40.0% and 100 nm, respectively. The volume-average particle diameters of the resin particles were each measured with a particle size analyzer of a dynamic light scattering system (product name: "UPA-EX150", manufactured by Nikkiso Co., Ltd) under the following conditions: SetZero: 30 seconds; number of times of measurement: 3 times; measurement time: 180 seconds; shape: perfect spherical shape; and refractive index: 1.59. A value in the column "Value of W1/W2 (times)" shown in Table 2-2 is the ratio of the ratio W1 (%) of the unit having an aromatic group to the ratio W2 (%) of the unit represented by the general formula (1) with respect to the total mass of the resin.

TABLE 2-1

Synthesis condition and property of resin particles

| | Units having aromatic group | | Units having cyano group | | (Meth)acrylic ester units having branched alkyl groups | | Units represented by general formula (1) | | Other Units | |
|---|---|---|---|---|---|---|---|---|---|---|
| Resin particle | Type | Amount (part) | Type | Amount (part) | Type | Amount (part) | Type(No.) | Amount (part) | EMA (part) | MAA (part) |
| 1 | St | 40.0 | AN | 30.0 | 2EHA | 20.0 | Compound 3 | 5.0 | | 5.0 |
| 2 | 4MSt | 40.0 | AN | 30.0 | 2EHA | 20.0 | Compound 3 | 5.0 | | 5.0 |
| 3 | 2CSt | 40.0 | AN | 30.0 | 2EHA | 20.0 | Compound 3 | 5.0 | | 5.0 |
| 4 | α MSt | 40.0 | AN | 30.0 | 2EHA | 20.0 | Compound 3 | 5.0 | | 5.0 |
| 5 | 2VNA | 40.0 | AN | 30.0 | 2EHA | 20.0 | Compound 3 | 5.0 | | 5.0 |
| 6 | St | 40.0 | MAN | 30.0 | 2EHA | 20.0 | Compound 3 | 5.0 | | 5.0 |
| 7 | St | 40.0 | 2CAN | 30.0 | 2EHA | 20.0 | Compound 3 | 5.0 | | 5.0 |
| 8 | St | 40.0 | AN | 30.0 | 2EHMA | 20.0 | Compound 3 | 5.0 | | 5.0 |
| 9 | St | 40.0 | AN | 30.0 | iBMA | 20.0 | Compound 3 | 5.0 | | 5.0 |
| 10 | St | 40.0 | AN | 30.0 | sBA | 20.0 | Compound 3 | 5.0 | | 5.0 |
| 11 | St | 40.0 | AN | 30.0 | 2EHA | 20.0 | Compound 1 | 5.0 | | 5.0 |
| 12 | St | 40.0 | AN | 30.0 | 2EHA | 20.0 | Compound 2 | 5.0 | | 5.0 |
| 13 | St | 40.0 | AN | 30.0 | 2EHA | 20.0 | Compound 4 | 5.0 | | 5.0 |
| 14 | St | 40.0 | AN | 30.0 | 2EHA | 20.0 | Compound 5 | 5.0 | | 5.0 |
| 15 | St | 40.0 | AN | 30.0 | 2EHA | 20.0 | Compound 6 | 5.0 | | 5.0 |
| 16 | St | 40.0 | AN | 30.0 | 2EHA | 20.0 | Compound 7 | 5.0 | | 5.0 |
| 17 | St | 40.0 | AN | 30.0 | 2EHA | 20.0 | Compound 8 | 5.0 | | 5.0 |
| 18 | St | 40.0 | AN | 30.0 | 2EHA | 20.0 | Compound 9 | 5.0 | | 5.0 |
| 19 | St | 40.0 | AN | 30.0 | 2EHA | 20.0 | Compound 3 | 5.0 | 5.0 | |
| 20 | St | 19.0 | AN | 30.0 | 2EHA | 20.0 | Compound 3 | 4.8 | 21.0 | 5.2 |
| 21 | St | 20.0 | AN | 30.0 | 2EHA | 20.0 | Compound 3 | 5.0 | 20.0 | 5.0 |
| 22 | St | 50.0 | AN | 20.0 | 2EHA | 20.0 | Compound 3 | 5.0 | | 5.0 |
| 23 | St | 51.0 | AN | 19.0 | 2EHA | 20.0 | Compound 3 | 5.1 | | 4.9 |
| 24 | St | 40.0 | AN | 4.0 | 2EHA | 20.0 | Compound 3 | 5.0 | 26.0 | 5.0 |
| 25 | St | 40.0 | AN | 5.0 | 2EHA | 20.0 | Compound 3 | 5.0 | 25.0 | 5.0 |
| 26 | St | 22.0 | AN | 50.0 | 2EHA | 18.0 | Compound 3 | 5.0 | | 5.0 |
| 27 | St | 21.0 | AN | 51.0 | 2EHA | 18.0 | Compound 3 | 5.0 | | 5.0 |
| 28 | St | 40.0 | AN | 30.0 | 2EHA | 9.0 | Compound 3 | 5.0 | 11.0 | 5.0 |
| 29 | St | 40.0 | AN | 30.0 | 2EHA | 10.0 | Compound 3 | 5.0 | 10.0 | 5.0 |

TABLE 2-1-continued

Synthesis condition and property of resin particles

| Resin particle | Units having aromatic group Type | Amount (part) | Units having cyano group Type | Amount (part) | (Meth)acrylic ester units having branched alkyl groups Type | Amount (part) | Units represented by general formula (1) Type(No.) | Amount (part) | Other Units EMA (part) | MAA (part) |
|---|---|---|---|---|---|---|---|---|---|---|
| 30 | St | 30.0 | AN | 20.0 | 2EHA | 40.0 | Compound 3 | 5.0 | | 5.0 |
| 31 | St | 30.0 | AN | 19.0 | 2EHA | 41.0 | Compound 3 | 5.0 | | 5.0 |
| 32 | St | 36.0 | AN | 30.0 | 2EHA | 20.0 | Compound 3 | 0.9 | 4.0 | 9.1 |
| 33 | St | 40.0 | AN | 30.0 | 2EHA | 20.0 | Compound 3 | 1.0 | | 9.0 |
| 34 | St | 40.0 | AN | 30.0 | 2EHA | 15.0 | Compound 3 | 10.0 | | 5.0 |
| 35 | St | 44.0 | AN | 30.0 | 2EHA | 15.0 | Compound 3 | 11.0 | | |
| 36 | St | 30.0 | AN | 30.0 | 2EHA | 20.0 | Compound 3 | 8.0 | 10.0 | 2.0 |
| 37 | St | 32.0 | AN | 30.0 | 2EHA | 20.0 | Compound 3 | 8.0 | 8.0 | 2.0 |
| 38 | St | 40.0 | AN | 30.0 | 2EHA | 18.0 | Compound 3 | 1.0 | 2.0 | 9.0 |
| 39 | St | 42.0 | AN | 30.0 | 2EHA | 18.0 | Compound 3 | 1.0 | | 9.0 |
| 40 | α MSt | 19.0 | 2CAN | 4.0 | iBMA | 9.0 | Compound 10 | 11.0 | 57.0 | |
| 41 | | | AN | 30.0 | 2EHA | 20.0 | Compound 3 | 5.0 | 40.0 | 5.0 |
| 42 | St | 40.0 | | | 2EHA | 20.0 | Compound 3 | 5.0 | 30.0 | 5.0 |
| 43 | St | 40.0 | AN | 30.0 | 2EHA | | Compound 3 | 5.0 | 20.0 | 5.0 |
| 44 | St | 40.0 | AN | 30.0 | 2EHA | 20.0 | | | | 10.0 |

TABLE 2-2

Synthesis condition and property of resin particles

| Resin particle | Percentage of units having aromatic group W1(%) | Percentage of units having cyano group (%) | Percentage of (meth)acrylic ester units having branched alkyl groups (%) | Percentage of units represented by general formula (1) W2(%) | Value of W1/W2 (times) |
|---|---|---|---|---|---|
| 1 | 40.0 | 30.0 | 20.0 | 5.0 | 8.0 |
| 2 | 40.0 | 30.0 | 20.0 | 5.0 | 8.0 |
| 3 | 40.0 | 30.0 | 20.0 | 5.0 | 8.0 |
| 4 | 40.0 | 30.0 | 20.0 | 5.0 | 8.0 |
| 5 | 40.0 | 30.0 | 20.0 | 5.0 | 8.0 |
| 6 | 40.0 | 30.0 | 20.0 | 5.0 | 8.0 |
| 7 | 40.0 | 30.0 | 20.0 | 5.0 | 8.0 |
| 8 | 40.0 | 30.0 | 20.0 | 5.0 | 8.0 |
| 9 | 40.0 | 30.0 | 20.0 | 5.0 | 8.0 |
| 10 | 40.0 | 30.0 | 20.0 | 5.0 | 8.0 |
| 11 | 40.0 | 30.0 | 20.0 | 5.0 | 8.0 |
| 12 | 40.0 | 30.0 | 20.0 | 5.0 | 8.0 |
| 13 | 40.0 | 30.0 | 20.0 | 5.0 | 8.0 |
| 14 | 40.0 | 30.0 | 20.0 | 5.0 | 8.0 |
| 15 | 40.0 | 30.0 | 20.0 | 5.0 | 8.0 |
| 16 | 40.0 | 30.0 | 20.0 | 5.0 | 8.0 |
| 17 | 40.0 | 30.0 | 20.0 | 5.0 | 8.0 |
| 18 | 40.0 | 30.0 | 20.0 | 5.0 | 8.0 |
| 19 | 40.0 | 30.0 | 20.0 | 5.0 | 8.0 |
| 20 | 19.0 | 30.0 | 20.0 | 4.8 | 4.0 |
| 21 | 20.0 | 30.0 | 20.0 | 5.0 | 4.0 |
| 22 | 50.0 | 20.0 | 20.0 | 5.0 | 10.0 |
| 23 | 51.0 | 19.0 | 20.0 | 5.1 | 10.0 |
| 24 | 40.0 | 4.0 | 20.0 | 5.0 | 8.0 |
| 25 | 40.0 | 5.0 | 20.0 | 5.0 | 8.0 |
| 26 | 22.0 | 50.0 | 18.0 | 5.0 | 4.4 |
| 27 | 21.0 | 51.0 | 18.0 | 5.0 | 4.2 |
| 28 | 40.0 | 30.0 | 9.0 | 5.0 | 8.0 |
| 29 | 40.0 | 30.0 | 10.0 | 5.0 | 8.0 |
| 30 | 30.0 | 20.0 | 40.0 | 5.0 | 6.0 |
| 31 | 30.0 | 19.0 | 41.0 | 5.0 | 6.0 |
| 32 | 36.0 | 30.0 | 20.0 | 0.9 | 40.0 |
| 33 | 40.0 | 30.0 | 20.0 | 1.0 | 40.0 |
| 34 | 40.0 | 30.0 | 15.0 | 10.0 | 4.0 |
| 35 | 44.0 | 30.0 | 15.0 | 11.0 | 4.0 |
| 36 | 30.0 | 30.0 | 20.0 | 8.0 | 3.8 |
| 37 | 32.0 | 30.0 | 20.0 | 8.0 | 4.0 |
| 38 | 40.0 | 30.0 | 18.0 | 1.0 | 40.0 |
| 39 | 42.0 | 30.0 | 18.0 | 1.0 | 42.0 |
| 40 | 19.0 | 4.0 | 9.0 | 11.0 | 1.7 |

TABLE 2-2-continued

| Synthesis condition and property of resin particles | | | | | |
|---|---|---|---|---|---|
| Resin particle | Percentage of units having aromatic group W1(%) | Percentage of units having cyano group (%) | Percentage of (meth)acrylic ester units having branched alkyl groups (%) | Percentage of units represented by general formula (1) W2(%) | Value of W1/W2 (times) |
| 41 | 0.0 | 30.0 | 20.0 | 5.0 | 0.0 |
| 42 | 40.0 | 0.0 | 20.0 | 5.0 | 8.0 |
| 43 | 40.0 | 30.0 | 0.0 | 5.0 | 8.0 |
| 44 | 40.0 | 30.0 | 20.0 | 0.0 | — |

(Resin Particle 45)

An aqueous dispersion liquid of a resin particle 45 in which the content and volume-average particle diameter (volume-based 50% cumulative particle diameter) of the resin particle were 20.0% and 80 nm, respectively was obtained in conformity with the description of the section "Preparation of Resin Particle 1" in Japanese Patent Application Laid-Open No. 2021-008604. The resin particle 45 is a resin particle having a core-shell structure and a resin for forming the resin particle is free of a unit derived from a (meth)acrylic acid ester having a branched alkyl group. The ratio W1 of the unit having an aromatic group in the resin for forming the resin particle 45, the ratio of the unit having a cyano group and the ratio W2 of the unit represented by the general formula (1) were 59.1%, 25.6% and 2.7%, respectively and the value of "W1/W2" was 21.9 times.

Preparation of Ink

Respective components (unit: %) shown in the middle column of Table 3 (Tables 3-1 to 3-6) were mixed and sufficiently stirred, followed by filtration with a cellulose acetate filter having a pore size of 3.0 μm (manufactured by Advantec) under pressure. Products whose numbers were shown in the upper sections of Tables 3 were used as a pigment dispersion liquid and a water dispersion liquid of a resin particle. The term "ACETYLENOL E100" shown in Table 3 represents the product name of a surfactant manufactured by Kawaken Fine Chemicals Co., Ltd. The content A of the pigment, the content B of the resin particle and the content C of the PEG whose EO number was 4 or more (EO number≥4) with respect to the total mass of each of the inks, and the value of "A/B" and the value of "B/C" were shown as ink characteristics in the lower section of each of Tables 3. In addition, the respective EO numbers (n1 and n2) of the resin particle and the PEG whose EO number was 4 or more (EO number≥4) used in each of the inks and the value of "n1/n2" were shown.

TABLE 3-1

| Composition and Property of Inks | Ink | | | | | | | | | | |
|---|---|---|---|---|---|---|---|---|---|---|---|
| | 1 | 2 | 3 | 4 | 5 | 6 | 7 | 8 | 9 | 10 | 11 |
| Type of pigment dispersion liquid | 1 | 2 | 3 + 4 | 4 | 5 | 1 | 1 | 1 | 1 | 1 | 1 |
| Type of resin particle | 1 | 1 | 1 | 1 | 1 | 2 | 3 | 4 | 5 | 6 | 7 |
| Pigment dispersion liquid | 30.0 | 30.0 | 22.5 + 7.5 | 30.0 | 30.0 | 30.0 | 30.0 | 30.0 | 30.0 | 30.0 | 30.0 |
| Water dispersion liquid of resin particle | 12.5 | 12.5 | 12.5 | 12.5 | 12.5 | 12.5 | 12.5 | 12.5 | 12.5 | 12.5 | 12.5 |
| PEG with EO number of 3 | | | | | | | | | | | |
| PEG with EO number of 4 | | | | | | | | | | | |
| PEG with EO number of 6 | | | | | | | | | | | |
| PEG with EO number of 13 | 10.0 | 10.0 | 10.0 | 10.0 | 10.0 | 10.0 | 10.0 | 10.0 | 10.0 | 10.0 | 10.0 |
| PEG with EO number of 25 | | | | | | | | | | | |
| PEG with EO number of 45 | | | | | | | | | | | |
| PEG with EO number of 46 | | | | | | | | | | | |
| Glycerin | 10.0 | 10.0 | 10.0 | 10.0 | 10.0 | 10.0 | 10.0 | 10.0 | 10.0 | 10.0 | 10.0 |
| ACETYLENOL E100 | 1.0 | 1.0 | 1.0 | 1.0 | 1.0 | 1.0 | 1.0 | 1.0 | 1.0 | 1.0 | 1.0 |
| Ion-exchanged water | 36.5 | 36.5 | 36.5 | 36.5 | 36.5 | 36.5 | 36.5 | 36.5 | 36.5 | 36.5 | 36.5 |
| Content A of the pigment (%) | 3.0 | 3.0 | 3.0 | 3.0 | 3.0 | 3.0 | 3.0 | 3.0 | 3.0 | 3.0 | 3.0 |
| Content B of the resin particle(%) | 5.0 | 5.0 | 5.0 | 5.0 | 5.0 | 5.0 | 5.0 | 5.0 | 5.0 | 5.0 | 5.0 |
| Content C of PEG with EO number ≥4 (%) | 10.0 | 10.0 | 10.0 | 10.0 | 10.0 | 10.0 | 10.0 | 10.0 | 10.0 | 10.0 | 10.0 |
| Value of A/B (times) | 0.6 | 0.6 | 0.6 | 0.6 | 0.6 | 0.6 | 0.6 | 0.6 | 0.6 | 0.6 | 0.6 |
| Value of B/C (times) | 0.5 | 0.5 | 0.5 | 0.5 | 0.5 | 0.5 | 0.5 | 0.5 | 0.5 | 0.5 | 0.5 |
| EO number of resin particle n1 | 10 | 10 | 10 | 10 | 10 | 10 | 10 | 10 | 10 | 10 | 10 |
| EO number of PEG n2 | 13 | 13 | 13 | 13 | 13 | 13 | 13 | 13 | 13 | 13 | 13 |
| Value of n1/n2 (times) | 0.8 | 0.8 | 0.8 | 0.8 | 0.8 | 0.8 | 0.8 | 0.8 | 0.8 | 0.8 | 0.8 |

TABLE 3-2

Composition and Property of Inks

| | Ink | | | | | | | | | | |
|---|---|---|---|---|---|---|---|---|---|---|---|
| | 12 | 13 | 14 | 15 | 16 | 17 | 18 | 19 | 20 | 21 | 22 |
| Type of pigment dispersion liquid | 1 | 1 | 1 | 1 | 1 | 1 | 1 | 1 | 1 | 1 | 1 |
| Type of resin particle | 8 | 9 | 10 | 11 | 12 | 13 | 14 | 15 | 16 | 17 | 18 |
| Pigment dispersion liquid | 30.0 | 30.0 | 30.0 | 30.0 | 30.0 | 30.0 | 30.0 | 30.0 | 30.0 | 30.0 | 30.0 |
| Water dispersion liquid of resin particle | 12.5 | 12.5 | 12.5 | 12.5 | 12.5 | 12.5 | 12.5 | 12.5 | 12.5 | 12.5 | 12.5 |
| PEG with EO number of 3 | | | | | | | | | | | |
| PEG with EO number of 4 | | | | | | | | | | | |
| PEG with EO number of 6 | | | | | | | | | | | |
| PEG with EO number of 13 | 10.0 | 10.0 | 10.0 | 10.0 | 10.0 | 10.0 | 10.0 | 10.0 | 10.0 | 10.0 | 10.0 |
| PEG with EO number of 25 | | | | | | | | | | | |
| PEG with EO number of 45 | | | | | | | | | | | |
| PEG with EO number of 46 | | | | | | | | | | | |
| Glycerin | 10.0 | 10.0 | 10.0 | 10.0 | 10.0 | 10.0 | 10.0 | 10.0 | 10.0 | 10.0 | 10.0 |
| ACETYLENOL E100 | 1.0 | 1.0 | 1.0 | 1.0 | 1.0 | 1.0 | 1.0 | 1.0 | 1.0 | 1.0 | 1.0 |
| Ion-exchanged water | 36.5 | 36.5 | 36.5 | 36.5 | 36.5 | 36.5 | 36.5 | 36.5 | 36.5 | 36.5 | 36.5 |
| Content A of the pigment (%) | 3.0 | 3.0 | 3.0 | 3.0 | 3.0 | 3.0 | 3.0 | 3.0 | 3.0 | 3.0 | 3.0 |
| Content B of the resin particle(%) | 5.0 | 5.0 | 5.0 | 5.0 | 5.0 | 5.0 | 5.0 | 5.0 | 5.0 | 5.0 | 5.0 |
| Content C of PEG with EO number ≥4 (%) | 10.0 | 10.0 | 10.0 | 10.0 | 10.0 | 10.0 | 10.0 | 10.0 | 10.0 | 10.0 | 10.0 |
| Value of A/B (times) | 0.6 | 0.6 | 0.6 | 0.6 | 0.6 | 0.6 | 0.6 | 0.6 | 0.6 | 0.6 | 0.6 |
| Value of B/C (times) | 0.5 | 0.5 | 0.5 | 0.5 | 0.5 | 0.5 | 0.5 | 0.5 | 0.5 | 0.5 | 0.5 |
| EO number of resin particle n1 | 10 | 10 | 10 | 4 | 5 | 10 | 10 | 10 | 10 | 30 | 31 |
| EO number of PEG n2 | 13 | 13 | 13 | 13 | 13 | 13 | 13 | 13 | 13 | 13 | 13 |
| Value of n1/n2 (times) | 0.8 | 0.8 | 0.8 | 0.3 | 0.4 | 0.8 | 0.8 | 0.8 | 0.8 | 2.3 | 2.4 |

TABLE 3-3

Composition and Property of Inks

| | Ink | | | | | | | | | | |
|---|---|---|---|---|---|---|---|---|---|---|---|
| | 23 | 24 | 25 | 26 | 27 | 28 | 29 | 30 | 31 | 32 | 33 |
| Type of pigment dispersion liquid | 1 | 1 | 1 | 1 | 1 | 1 | 1 | 1 | 1 | 1 | 1 |
| Type of resin particle | 19 | 20 | 21 | 22 | 23 | 24 | 25 | 26 | 27 | 28 | 29 |
| Pigment dispersion liquid | 30.0 | 30.0 | 30.0 | 30.0 | 30.0 | 30.0 | 30.0 | 30.0 | 30.0 | 30.0 | 30.0 |
| Water dispersion liquid of resin particle | 12.5 | 12.5 | 12.5 | 12.5 | 12.5 | 12.5 | 12.5 | 12.5 | 12.5 | 12.5 | 12.5 |
| PEG with EO number of 3 | | | | | | | | | | | |
| PEG with EO number of 4 | | | | | | | | | | | |
| PEG with EO number of 6 | | | | | | | | | | | |
| PEG with EO number of 13 | 10.0 | 10.0 | 10.0 | 10.0 | 10.0 | 10.0 | 10.0 | 10.0 | 10.0 | 10.0 | 10.0 |
| PEG with EO number of 25 | | | | | | | | | | | |
| PEG with EO number of 45 | | | | | | | | | | | |
| PEG with EO number of 46 | | | | | | | | | | | |
| Glycerin | 10.0 | 10.0 | 10.0 | 10.0 | 10.0 | 10.0 | 10.0 | 10.0 | 10.0 | 10.0 | 10.0 |
| ACETYLENOL E100 | 1.0 | 1.0 | 1.0 | 1.0 | 1.0 | 1.0 | 1.0 | 1.0 | 1.0 | 1.0 | 1.0 |
| Ion-exchanged water | 36.5 | 36.5 | 36.5 | 36.5 | 36.5 | 36.5 | 36.5 | 36.5 | 36.5 | 36.5 | 36.5 |
| Content A of the pigment (%) | 3.0 | 3.0 | 3.0 | 3.0 | 3.0 | 3.0 | 3.0 | 3.0 | 3.0 | 3.0 | 3.0 |
| Content B of the resin particle(%) | 5.0 | 5.0 | 5.0 | 5.0 | 5.0 | 5.0 | 5.0 | 5.0 | 5.0 | 5.0 | 5.0 |
| Content C of PEG with EO number ≥4 (%) | 10.0 | 10.0 | 10.0 | 10.0 | 10.0 | 10.0 | 10.0 | 10.0 | 10.0 | 10.0 | 10.0 |
| Value of A/B (times) | 0.6 | 0.6 | 0.6 | 0.6 | 0.6 | 0.6 | 0.6 | 0.6 | 0.6 | 0.6 | 0.6 |
| Value of B/C (times) | 0.5 | 0.5 | 0.5 | 0.5 | 0.5 | 0.5 | 0.5 | 0.5 | 0.5 | 0.5 | 0.5 |
| EO number of resin particle n1 | 10 | 10 | 10 | 10 | 10 | 10 | 10 | 10 | 10 | 10 | 10 |
| EO number of PEG n2 | 13 | 13 | 13 | 13 | 13 | 13 | 13 | 13 | 13 | 13 | 13 |
| Value of n1/n2 (times) | 0.8 | 0.8 | 0.8 | 0.8 | 0.8 | 0.8 | 0.8 | 0.8 | 0.8 | 0.8 | 0.8 |

TABLE 3-4

Composition and Property of Inks

| | Ink | | | | | | | | | | |
|---|---|---|---|---|---|---|---|---|---|---|---|
| | 34 | 35 | 36 | 37 | 38 | 39 | 40 | 41 | 42 | 43 | 44 |
| Type of pigment dispersion liquid | 1 | 1 | 1 | 1 | 1 | 1 | 1 | 1 | 1 | 1 | 1 |
| Type of resin particle | 30 | 31 | 32 | 33 | 34 | 35 | 36 | 37 | 38 | 39 | 1 |
| Pigment dispersion liquid | 30.0 | 30.0 | 30.0 | 30.0 | 30.0 | 30.0 | 30.0 | 30.0 | 30.0 | 30.0 | 30.0 |
| Water dispersion liquid of resin particle | 12.5 | 12.5 | 12.5 | 12.5 | 12.5 | 12.5 | 12.5 | 12.5 | 12.5 | 12.5 | 2.0 |
| PEG with EO number of 3 | | | | | | | | | | | |
| PEG with EO number of 4 | | | | | | | | | | | |
| PEG with EO number of 6 | | | | | | | | | | | |
| PEG with EO number of 13 | 10.0 | 10.0 | 10.0 | 10.0 | 10.0 | 10.0 | 10.0 | 10.0 | 10.0 | 10.0 | 1.6 |
| PEG with EO number of 25 | | | | | | | | | | | |
| PEG with EO number of 45 | | | | | | | | | | | |
| PEG with EO number of 46 | | | | | | | | | | | |
| Glycerin | 10.0 | 10.0 | 10.0 | 10.0 | 10.0 | 10.0 | 10.0 | 10.0 | 10.0 | 10.0 | 10.0 |
| ACETYLENOL E100 | 1.0 | 1.0 | 1.0 | 1.0 | 1.0 | 1.0 | 1.0 | 1.0 | 1.0 | 1.0 | 1.0 |
| Ion-exchanged water | 36.5 | 36.5 | 36.5 | 36.5 | 36.5 | 36.5 | 36.5 | 36.5 | 36.5 | 36.5 | 55.4 |
| Content A of the pigment (%) | 3.0 | 3.0 | 3.0 | 3.0 | 3.0 | 3.0 | 3.0 | 3.0 | 3.0 | 3.0 | 3.0 |
| Content B of the resin particle(%) | 5.0 | 5.0 | 5.0 | 5.0 | 5.0 | 5.0 | 5.0 | 5.0 | 5.0 | 5.0 | 0.8 |
| Content C of PEG with EO number ≥4 (%) | 10.0 | 10.0 | 10.0 | 10.0 | 10.0 | 10.0 | 10.0 | 10.0 | 10.0 | 10.0 | 1.6 |
| Value of A/B (times) | 0.6 | 0.6 | 0.6 | 0.6 | 0.6 | 0.6 | 0.6 | 0.6 | 0.6 | 0.6 | 3.8 |
| Value of B/C (times) | 0.5 | 0.5 | 0.5 | 0.5 | 0.5 | 0.5 | 0.5 | 0.5 | 0.5 | 0.5 | 0.5 |
| EO number of resin particle n1 | 10 | 10 | 10 | 10 | 10 | 10 | 10 | 10 | 10 | 10 | 10 |
| EO number of PEG n2 | 13 | 13 | 13 | 13 | 13 | 13 | 13 | 13 | 13 | 13 | 13 |
| Value of n1/n2 (times) | 0.8 | 0.8 | 0.8 | 0.8 | 0.8 | 0.8 | 0.8 | 0.8 | 0.8 | 0.8 | 0.8 |

TABLE 3-5

Composition and Property of Inks

| | Ink | | | | | | | | | | |
|---|---|---|---|---|---|---|---|---|---|---|---|
| | 45 | 46 | 47 | 48 | 49 | 50 | 51 | 52 | 53 | 54 | 55 |
| Type of pigment dispersion liquid | 1 | 1 | 1 | 1 | 1 | 1 | 1 | 1 | 1 | 1 | 1 |
| Type of resin particle | 1 | 1 | 1 | 1 | 1 | 1 | 17 | 17 | 12 | 12 | 17 |
| Pigment dispersion liquid | 30.0 | 30.0 | 30.0 | 30.0 | 30.0 | 30.0 | 30.0 | 30.0 | 30.0 | 30.0 | 30.0 |
| Water dispersion liquid of resin particle | 2.5 | 37.5 | 38.0 | 12.5 | 12.5 | 12.5 | 12.5 | 12.5 | 12.5 | 12.5 | 12.5 |
| PEG with EO number of 3 | | | | | 10.0 | | | | | | |
| PEG with EO number of 4 | | | | | | 10.0 | | | | | |
| PEG with EO number of 6 | | | | | | | | | | | 10.0 |
| PEG with EO number of 13 | 2.0 | 10.0 | 10.0 | | | | | | | | |
| PEG with EO number of 25 | | | | | | | | | | 10.0 | |
| PEG with EO number of 45 | | | | | | | 10.0 | | 10.0 | | |
| PEG with EO number of 46 | | | | | | | | 10.0 | | | |
| Glycerin | 10.0 | 10.0 | 10.0 | 10.0 | 10.0 | 10.0 | 10.0 | 10.0 | 10.0 | 10.0 | 10.0 |
| ACETYLENOL E100 | 1.0 | 1.0 | 1.0 | 1.0 | 1.0 | 1.0 | 1.0 | 1.0 | 1.0 | 1.0 | 1.0 |
| Ion-exchanged water | 54.5 | 11.5 | 11.0 | 46.5 | 36.5 | 36.5 | 36.5 | 36.5 | 36.5 | 36.5 | 36.5 |
| Content A of the pigment (%) | 3.0 | 3.0 | 3.0 | 3.0 | 3.0 | 3.0 | 3.0 | 3.0 | 3.0 | 3.0 | 3.0 |
| Content B of the resin particle(%) | 1.0 | 15.0 | 15.2 | 5.0 | 5.0 | 5.0 | 5.0 | 5.0 | 5.0 | 5.0 | 5.0 |
| Content C of PEG with EO number ≥4 (%) | 2.0 | 10.0 | 10.0 | 0.0 | 10.0 | 10.0 | 10.0 | 10.0 | 10.0 | 10.0 | 10.0 |
| Value of A/B (times) | 3.0 | 0.2 | 0.2 | 0.6 | 0.6 | 0.6 | 0.6 | 0.6 | 0.6 | 0.6 | 0.6 |
| Value of B/C (times) | 0.5 | 1.5 | 1.5 | — | 0.5 | 0.5 | 0.5 | 0.5 | 0.5 | 0.5 | 0.5 |
| EO number of resin particle n1 | 10 | 10 | 10 | 10 | 10 | 10 | 30 | 30 | 5 | 5 | 30 |
| EO number of PEG n2 | 13 | 13 | 13 | — | 3 | 4 | 45 | 46 | 45 | 25 | 6 |
| Value of n1/n2 (times) | 0.8 | 0.8 | 0.8 | — | 3.3 | 2.5 | 0.7 | 0.7 | 0.1 | 0.2 | 5.0 |

TABLE 3-6

| Composition and Property of Inks | | | | | | | | | | | | |
|---|---|---|---|---|---|---|---|---|---|---|---|---|
| | Ink | | | | | | | | | | | |
| | 56 | 57 | 58 | 59 | 60 | 61 | 62 | 63 | 64 | 65 | 66 | 67 |
| Type of pigment dispersion liquid | 1 | 1 | 1 | 1 | 1 | 1 | 1 | 1 | 1 | 1 | 1 | 1 |
| Type of resin particle | 17 | 1 | 1 | 1 | 1 | 40 | — | 41 | 42 | 43 | 44 | 45 |
| Pigment dispersion liquid | 30.0 | 30.0 | 30.0 | 30.0 | 30.0 | 30.0 | 30.0 | 30.0 | 30.0 | 30.0 | 30.0 | 30.0 |
| Water dispersion liquid of resin particle | 12.5 | 12.5 | 12.5 | 12.5 | 12.5 | 2.0 | | 12.5 | 12.5 | 12.5 | 12.5 | 25.0 |
| PEG with EO number of 3 | | | | | | | | | | | | |
| PEG with EO number of 4 | 10.0 | | | | | | | | | | | |
| PEG with EO number of 6 | | | | | | | | | | | | |
| PEG with EO number of 13 | | 21.0 | 20.0 | 1.0 | 0.8 | | 10.0 | 10.0 | 10.0 | 10.0 | 10.0 | 10.0 |
| PEG with EO number of 25 | | | | | | | | | | | | |
| PEG with EO number of 45 | | | | | | | | | | | | |
| PEG with EO number of 46 | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 |
| ACETYLENOL E100 | 1.0 | 1.0 | 1.0 | 1.0 | 1.0 | 1.0 | 1.0 | 1.0 | 1.0 | 1.0 | 1.0 | 1.0 |
| Ion-exchanged water | 36.5 | 25.5 | 26.5 | 45.5 | 45.7 | 57.0 | 49.0 | 36.5 | 36.5 | 36.5 | 36.5 | 24.0 |
| Content A of the pigment (%) | 3.0 | 3.0 | 3.0 | 3.0 | 3.0 | 3.0 | 3.0 | 3.0 | 3.0 | 3.0 | 3.0 | 3.0 |
| Content B of the resin particle(%) | 5.0 | 5.0 | 5.0 | 5.0 | 5.0 | 0.8 | 0.0 | 5.0 | 5.0 | 5.0 | 5.0 | 5.0 |
| Content C of PEG with EO number ≥4 (%) | 10.0 | 21.0 | 20.0 | 1.0 | 0.8 | 0.0 | 10.0 | 10.0 | 10.0 | 10.0 | 10.0 | 10.0 |
| Value of A/B (times) | 0.6 | 0.6 | 0.6 | 0.6 | 0.6 | 3.8 | — | 0.6 | 0.6 | 0.6 | 0.6 | 0.6 |
| Value of B/C (times) | 0.5 | 0.2 | 0.3 | 5.0 | 6.3 | — | 0.0 | 0.5 | 0.5 | 0.5 | 0.5 | 0.5 |
| EO number of resin particle n1 | 30 | 10 | 10 | 10 | 10 | 31 | — | 10 | 10 | 10 | — | 10 |
| EO number of PEG n2 | 4 | 13 | 13 | 13 | 13 | — | 13 | 13 | 13 | 13 | 13 | 13 |
| Value of n1/n2 (times) | 7.5 | 0.8 | 0.8 | 0.8 | 0.8 | — | — | 0.8 | 0.8 | 0.8 | — | 0.8 |

Preparation of Reaction Liquid

Respective components (unit: %) shown in Table 4 was mixed and sufficiently stirred, followed by filtration with a cellulose acetate filter having a pore size of 3.0 μm (manufactured by Advantec) under pressure. The term "PAA-HCL-3L" shown in Table 4 represents the product name of polyallylamine manufactured by Nittobo Medical Co., Ltd. and the term "Acetylenol E100" shown therein represents the product name of a surfactant manufactured by Kawaken Fine Chemicals Co., Ltd.

TABLE 4

| Composition of reaction liquid | | | | | |
|---|---|---|---|---|---|
| | Reaction liquid | | | | |
| | 1 | 2 | 3 | 4 | 5 |
| Magnesium sulfate | 15.0 | | | | |
| Calcium sulfate | | 15.0 | | | |
| Aluminum sulfate | | | 15.0 | | |
| Malic acid | | | | 15.0 | |
| PAA-HCL-3L | | | | | 15.0 |
| Glycerin | 20.0 | 20.0 | 20.0 | 20.0 | 20.0 |
| ACETYLENOL E100 | 1.0 | 1.0 | 1.0 | 1.0 | 1.0 |
| Ion-exchanged water | 64.0 | 64.0 | 64.0 | 64.0 | 64.0 |

Evaluations of Inks

The inks shown in Table 5 were each filled into the ink applying device 1202 of the ink jet recording apparatus 100 having a configuration illustrated in FIG. 1. A solid image measuring 2 cm by 2 cm, the image having an ink recording duty of 100%, was recorded on high quality paper (product name: "npi HIGH QUALITY", manufactured by Nippon Paper Industries Co., Ltd., basis weight: 157.0 g/m$^2$) with the ink jet recording apparatus 100. In this Example, an image recorded under the following conditions is defined as having a recording duty of 100%: one ink droplet having a mass of 3.0 ng is applied to a unit region measuring 1/1,200 inch by 1/1,200 inch. In this Example, in evaluation criteria for each of the following items, while ranks "A" and "B" were defined as acceptable levels, ranks "C" and "D" were defined as an unacceptable level. The evaluation results are shown in Table 5.

(Abrasion Resistance)

One minute after the recording, the recorded solid image was subjected to a friction test with a wear resistance tester (manufactured by Imoto Machinery Co., Ltd.) that was a gakushin-type tester in conformity with JIS L 0849 under the following conditions: the image was reciprocally rubbed with a load of 100 g for 3 times, 5 times and 7 times. The solid image after the friction test was visually observed and the abrasion resistance of the image was evaluated in accordance with the following evaluation criteria.

A: The solid image was not scraped even after the 7 reciprocations.

B: The solid image was not scraped after the 5 reciprocations but the solid image was scraped to show the white ground of the recording medium after the 7 reciprocations.

C: The solid image was not scraped after the 3 reciprocations but the solid image was scraped to show the white ground of the recording medium after the 5 reciprocations.

D: The solid image was scraped to show the white ground of the recording medium after the 3 reciprocations.

(Color Developability)

The recorded solid image was placed in an environment at a temperature of 23° C. and a relative humidity of 55% for 24 hours. After that, the optical density of a color component corresponding to the coloring material of the ink in the solid image was measured with a spectrophotometer under the conditions of a D50 light source and a 2-degree field of view, followed by the evaluation of the color developability of the image in accordance with the following evaluation criteria. The optical density was measured with a spectrophotometer (product name: "Spectrolino", manufactured by GretagMacbeth LLC) as follows: when the coloring material was carbon black, the optical density of a black component was measured and when the coloring material was a color pigment, the optical density of a color component (cyan, magenta or yellow) was measured.

A: The optical density of the black component was 1.2 or more or the optical density of the color component was 1.1 or more.

B: The optical density of the black component was 1.1 or more to less than 1.2 or the optical density of the color component was 1.0 or more to less than 1.1.

C: The optical density of the black component was less than 1.1 or the optical density of the color component was less than 1.0.

TABLE 5

| | | Evaluation results | | |
|---|---|---|---|---|
| | | Ink | Abration resistance | Color developability |
| Example | 1 | 1 | A | A |
| | 2 | 2 | A | A |
| | 3 | 3 | A | A |
| | 4 | 4 | A | A |
| | 5 | 5 | A | A |
| | 6 | 6 | A | A |
| | 7 | 7 | A | A |
| | 8 | 8 | B | A |
| | 9 | 9 | B | A |
| | 10 | 10 | A | A |
| | 11 | 11 | A | B |
| | 12 | 12 | B | A |
| | 13 | 13 | B | A |
| | 14 | 14 | B | A |
| | 15 | 15 | B | B |
| | 16 | 16 | A | A |
| | 17 | 17 | B | B |
| | 18 | 18 | A | A |
| | 19 | 19 | A | A |
| | 20 | 20 | B | B |
| | 21 | 21 | A | A |
| | 22 | 22 | B | B |
| | 23 | 23 | A | A |
| | 24 | 24 | B | A |
| | 25 | 25 | A | A |
| | 26 | 26 | A | A |
| | 27 | 27 | B | A |
| | 28 | 28 | A | B |
| | 29 | 29 | A | A |
| | 30 | 30 | A | A |
| | 31 | 31 | A | B |
| | 32 | 32 | B | A |
| | 33 | 33 | A | A |
| | 34 | 34 | A | A |
| Example | 35 | 35 | A | B |
| | 36 | 36 | B | B |
| | 37 | 37 | A | A |
| | 38 | 38 | A | A |
| | 39 | 39 | B | A |
| | 40 | 40 | B | A |
| | 41 | 41 | A | A |
| | 42 | 42 | A | A |
| | 43 | 43 | A | B |
| | 44 | 44 | B | A |
| | 45 | 45 | A | A |
| | 46 | 46 | A | A |

TABLE 5-continued

| | | Evaluation results | | |
|---|---|---|---|---|
| | | Ink | Abration resistance | Color developability |
| | 47 | 47 | A | B |
| | 48 | 48 | B | A |
| | 49 | 49 | B | A |
| | 50 | 50 | A | A |
| | 51 | 51 | A | A |
| | 52 | 52 | B | A |
| | 53 | 53 | B | A |
| | 54 | 54 | A | A |
| | 55 | 55 | A | A |
| | 56 | 56 | B | A |
| | 57 | 57 | B | A |
| | 58 | 58 | A | A |
| | 59 | 59 | A | A |
| | 60 | 60 | B | A |
| | 61 | 61 | B | B |
| Comparative Example | 1 | 62 | D | C |
| | 2 | 63 | C | B |
| | 3 | 64 | B | C |
| | 4 | 65 | C | B |
| | 5 | 66 | B | C |
| | 6 | 67 | C | B |

Evaluations of Ink Sets

A reaction liquid and an ink that were combined as shown in Table 6 were filled into the reaction liquid applying device 1201 and ink applying device 1202 of the ink jet recording apparatus 100 having a configuration illustrated in FIG. 1, respectively. In this Example, an image recorded under the following conditions is defined as having a recording duty of 100%: one ink droplet having a mass of 3.0 ng is applied to a unit region measuring 1/1,200 inch by 1/1,200 inch. In this Example, in evaluation criteria for each of the following items, while ranks "A" and "B" were defined as acceptable levels, a rank "C" was defined as an unacceptable level. The evaluation results are shown in Table 6.

(Abrasion Resistance)

A solid image measuring 2 cm by 2 cm, the image having a reaction liquid recording duty of 15% and an ink recording duty of 100%, was recorded on a recording medium with the ink jet recording apparatus 100 having the above-mentioned configuration. npi HIGH QUALITY (manufactured by Nippon Paper Industries Co., Ltd., basis weight: 157.0 g/$m^2$) was used as the recording medium. The recorded solid image was placed under an environment at a temperature of 23° C. and a relative humidity of 55% for 24 hours. After that, the recorded solid image was subjected to a friction test with the wear resistance tester (manufactured by Imoto Machinery Co., Ltd.) that was a gakushin-type tester in conformity with JIS L 0849 under the following conditions: the image was reciprocally rubbed with a load of 200 g 1 time or 3 times. The solid image after the friction test was visually observed and the abrasion resistance of the image was evaluated in accordance with the following evaluation criteria.

A: The solid image was not scraped even after the 5 reciprocations.

B: The solid image was not scraped after the 3 reciprocations but the solid image was scraped to show the white ground of the recording medium after the 5 reciprocations.

C: The solid image was scraped to show the white ground of the recording medium after the 3 reciprocations.

(Suppression of Image Unevenness)

A solid image measuring 5 cm by 5 cm, the image having a reaction liquid recording duty of 15% and an ink recording duty of 100%, was recorded on a recording medium with the ink jet recording apparatus 100 having the above-mentioned configuration. The recorded solid image was read with a scanner (product name: "DR-C225II", manufactured by Canon Inc.) and the area ratio of a portion recorded in accordance with input data (the dark portion of the image) was calculated by subjecting the solid image to binarization processing. The reading was performed under such a condition that the read image had a color and a resolution of 600 dpi. The binarization processing was performed as follows: the image was converted into 8-bit data with image processing software "Image J"; and then the value of [(255+G top)/2] using a gradation value (G top) at the peak of a brightness histogram in which a white color corresponded to 255 and a black color corresponded to 0 was set as a threshold. The ratio (area ratio) of an area having a gradation value equal to or more than the threshold thus obtained was calculated and the suppression of image unevenness was evaluated in accordance with the following evaluation criteria.

A: The area ratio was 100.0%.

B: The area ratio was more than 99.0% to less than 100.0%.

C: The area ratio was 99.0% or less.

TABLE 6

Evaluation conditions and results

| | | Ink | Reaction liquid | Abration resistance | Suppression of Image Unevenness |
|---|---|---|---|---|---|
| Example | 62 | 1 | 1 | A | A |
| | 63 | 2 | 1 | A | A |
| | 64 | 3 | 1 | A | A |
| | 65 | 4 | 1 | A | A |
| | 66 | 5 | 1 | A | A |
| | 67 | 23 | 1 | B | B |
| | 68 | 48 | 1 | B | A |
| | 69 | 1 | 2 | A | A |
| | 70 | 1 | 3 | A | A |
| | 71 | 1 | 4 | A | B |
| | 72 | 1 | 5 | B | A |
| Comparative Example | 7 | 62 | 1 | C | A |

According to the present invention, there can be provided the aqueous ink that can record an image achieving both of high abrasion resistance and high color developability. In addition, according to the present invention, the ink set, the ink jet recording method and the ink jet recording apparatus using the aqueous ink can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-167229, filed Oct. 18, 2022, Japanese Patent Application No. 2022-167230, filed Oct. 18, 2022, Japanese Patent Application No. 2022-188254 filed Nov. 25, 2022, and Japanese Patent Application No. 2023-148885, filed Sep. 14, 2023, which are hereby incorporated by reference herein in their entirety.

What is claimed is:

1. An aqueous ink for ink jet comprising:

a coloring material; and a resin particle, wherein a resin for forming the resin particle includes a unit having an aromatic group, a unit having a cyano group, a unit derived from a (meth)acrylic acid ester having a branched alkyl group, and a unit represented by the following general formula (1):

(1)

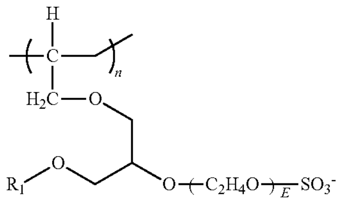

wherein, in the general formula (1), "n" represents the number of a repeating unit, $R_1$ represents an alkyl group, and E represents the number of repeating units of an ethylene oxide group and satisfies E≥1.

2. The aqueous ink according to claim 1, wherein a ratio (% by mass) of the unit having an aromatic group to the resin for forming the resin particle is 20.0% by mass or more to 50.0% by mass or less with respect to a total mass of the resin.

3. The aqueous ink according to claim 1, wherein a ratio (% by mass) of the unit having a cyano group to the resin for forming the resin particle is 5.0% by mass or more to 50.0% by mass or less with respect to a total mass of the resin.

4. The aqueous ink according to claim 1, wherein a ratio (% by mass) of the unit derived from a (meth)acrylic acid ester having a branched alkyl group to the resin for forming the resin particle is 10.0% by mass or more to 40.0% by mass or less with respect to a total mass of the resin.

5. The aqueous ink according to claim 1, wherein a ratio (% by mass) of the unit represented by the general formula (1) to the resin for forming the resin particle is 1.0% by mass or more to 10.0% by mass or less with respect to a total mass of the resin.

6. The aqueous ink according to claim 1, wherein a ratio W1 (% by mass) of the unit having an aromatic group to the resin for forming the resin particle and a ratio W2 (% by mass) of the unit represented by the general formula (1) thereto satisfy a relationship of 4.0≤W1/W2≤40.0.

7. The aqueous ink according to claim 1, wherein the unit having an aromatic group is a unit represented by the following general formula (2):

(2)

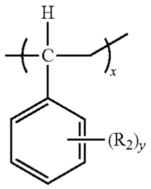

wherein, in the general formula (2), "x" represents the number of a repeating unit, $R_2$'s each independently represent an alkyl group or a halogen atom, and "y" represents an integer of from 0 to 5.

8. The aqueous ink according to claim 1, wherein the unit having a cyano group is a unit derived from at least one kind of monomer selected from the group consisting of acrylonitrile and methacrylonitrile.

9. The aqueous ink according to claim 1, wherein the unit derived from a (meth)acrylic acid ester having a branched alkyl group is a unit derived from 2-ethylhexyl(meth)acrylate.

10. The aqueous ink according to claim 1, wherein the alkyl group represented by $R_1$ in the general formula (1) has 9 or more to 14 or less carbon atoms.

11. The aqueous ink according to claim 1, wherein the number of the repeating units of the ethylene oxide group represented by E in the general formula (1) is 5 or more to 30 or less.

12. The aqueous ink according to claim 1, wherein a content (% by mass) of the resin particle in the aqueous ink is 1.0% by mass or more to 15.0% by mass or less with respect to a total mass of the ink.

13. The aqueous ink according to claim 1, wherein the aqueous ink further comprises a water-soluble organic solvent containing polyethylene glycol whose number of ethylene oxide groups is 4 or more, and wherein the number (n1) of the ethylene oxide groups of the unit represented by the general formula (1) in the resin for forming the resin particle and the number (n2) of the ethylene oxide groups of the polyethylene glycol satisfy a relationship of $0.25 n1/n2 \leq 5.0$.

14. The aqueous ink according to claim 13, wherein a mass ratio of a content (% by mass) of the resin particle in the aqueous ink to a content (% by mass) of the polyethylene glycol is 0.3 times or more to 5.0 times or less.

15. An ink set for ink jet comprising a combination of an aqueous ink and an aqueous reaction liquid containing a reactant that reacts with the aqueous ink, wherein the aqueous ink is the aqueous ink of claim 1, wherein the coloring material is dispersed by an action of a carboxylic acid group, wherein the resin further includes a unit having a carboxylic acid group, and wherein the reactant is a polyvalent metal ion.

16. An ink jet recording method comprising ejecting an ink from a recording head of an ink jet system to record an image on a recording medium, wherein the ink is the aqueous ink of claim 1.

17. The aqueous ink according to claim 1, wherein a content (% by mass) of the coloring material in the aqueous ink is 0.5% by mass or more to 15.0% by mass or less with respect to a total mass of the ink.

18. The aqueous ink according to claim 13, wherein a content (% by mass) of the polyethylene glycol whose number of ethylene oxide groups is 4 or more in the aqueous ink is 1.0% by mass or more to 20.0% by mass or less with respect to a total mass of the ink.

19. The aqueous ink according to claim 1, wherein the resin particle does not include any coloring material.

20. The aqueous ink according to claim 1, wherein the coloring material comprises a pigment.

21. The aqueous ink according to claim 20, wherein the pigment comprises at least one of a (i) self-dispersible pigment in which an anionic group is bonded to its particle surface directly or through another atomic group, or (ii) a resin-dispersed pigment.

22. The aqueous ink according to claim 20, wherein the pigment comprises a resin dispersed organic pigment.

23. The aqueous ink according to claim 20, wherein the pigment comprises a self-dispersible carbon black in which an anionic group is bonded to its particle surface directly or through another atomic group.

* * * * *